United States Patent
Bourdelais et al.

(12) 
(10) Patent No.: US 6,566,024 B1
(45) Date of Patent: May 20, 2003

(54) QUINTESSENTIAL PICTORIAL LABEL AND ITS DISTRIBUTION

(75) Inventors: Robert P. Bourdelais, Pittsford, NY (US); Mridula Nair, Penfield, NY (US); William T. Rochford, Rochester, NY (US); John B. Rieger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/027,971

(22) Filed: Dec. 21, 2001

(51) Int. Cl.⁷ .................. G03C 1/805; G03C 7/32; G03C 11/08; G03C 11/12
(52) U.S. Cl. .................. 430/11; 430/256; 430/259; 430/262; 430/263; 430/536; 430/538; 430/961
(58) Field of Search ................ 430/256, 259, 430/262, 263, 536, 961, 538, 11

(56) References Cited

U.S. PATENT DOCUMENTS

| | | |
|---|---|---|
| 4,705,745 A | 11/1987 | Kitchin et al. |
| 4,816,378 A | 3/1989 | Powers et al. |
| 5,679,139 A | 10/1997 | McInerney et al. |
| 5,679,140 A | 10/1997 | McInerney et al. |
| 5,679,141 A | 10/1997 | McInerney et al. |
| 5,679,142 A | 10/1997 | McInerney et al. |
| 5,866,282 A | 2/1999 | Bourdelais et al. |
| 5,888,683 A | 3/1999 | Gula et al. |
| 5,891,825 A | 4/1999 | Ushio et al. |
| 5,985,075 A | 11/1999 | Freedman .............. 156/229 |
| 6,022,679 A | 2/2000 | Kawamoto |
| 6,030,756 A | 2/2000 | Bourdelais et al. ......... 430/536 |
| 6,045,965 A * | 4/2000 | Cournoyer et al. ......... 430/259 |
| 6,110,552 A | 8/2000 | Casey et al. |
| 6,130,024 A | 10/2000 | Aylward et al. ............ 430/536 |
| 6,146,744 A | 11/2000 | Freedman .............. 428/213 |
| 6,277,547 B1 | 8/2001 | Bourdelais et al. ......... 430/536 |
| 6,436,604 B1 * | 8/2002 | Bourdelais et al. ......... 430/259 |

FOREIGN PATENT DOCUMENTS

EP  0 915 374  5/1999

* cited by examiner

Primary Examiner—Richard L. Schilling
(74) Attorney, Agent, or Firm—Paul A. Leipold

(57) ABSTRACT

The invention relates a photographic label comprising a pragmatic polymer sheet, at least one layer comprising an image comprising dyes formed from couplers above said pragmatic polymer sheet, and a lower strippable paper carrier, a pressure sensitive adhesive layer between said lower strippable carrier and said pragmatic polymer sheet, and an environmental protection layer overlaying at least one photosensitive layer wherein said carrier has exposed edges where it has a greater surface area than the pragmatic sheet and said image further comprises fiducial marks.

33 Claims, No Drawings

QUINTESSENTIAL PICTORIAL LABEL AND ITS DISTRIBUTION

FIELD OF THE INVENTION

The invention relates to packaging materials. In a preferred form it relates to the use of a high quality silver halide pressure sensitive label for application to packages.

BACKGROUND OF THE INVENTION

Pressure sensitive labels are applied to packages to build brand awareness, show the contents of the package, convey a quality message regarding the contents of a package and supply consumer information such as directions on product use, or an ingredient listing of the contents. Printing on the pressure sensitive label is typically done using gravure printing or flexography is applied to the package. There is a continuing need to improve the visual appeal of labels to increase shelf awareness of products. Prior art printed labels have attempted to provide improved visual information on labels by utilizing multiple print stations in a printing press to achieve "photographic quality". While nine color presses do provide a good image, silver halide images provide depth, excellent flesh tone replication, excellent tone scale and superior image sharpness.

Prior art labels that are applied to packages consist of a base material, a pressure sensitive adhesive and a liner. The label substrate consisting of the base, pressure sensitive adhesive and liner are typically laminated and then printed utilizing a variety of non photographic printing methods. After printing, the labels are generally protected by an over laminate material or a protective coating. The completed label consisting of a protection layer, printed information, base, pressure sensitive adhesive is applied to packages utilizing high speed labeling equipment.

Flexography is an offset letterpress technique where the printing plates are made from rubber or photopolymers. The printing on pressure sensitive label is accomplished by the transfer of ink from the raised surface of the printing plate to the surface of the material being printed. The rotogravure method of printing uses a print cylinder with thousands of tiny cells which are below the surface of the printing cylinder. The ink is transferred from the cells when the print cylinder is brought into contact with the pressure sensitive label at the impression roll. Printing inks for flexography or rotogravure include solvent based inks, water based inks and radiation cured inks. While rotogravure and flexography printing do provide acceptable image quality, these two printing methods require expensive and time consuming preparation of print cylinders or printing plates which make printing jobs of less than 100,000 units expensive as the set up cost and the cost of the cylinders or printing plates is typically depreciated over the size of the print job.

Recently, digital printing has become a viable method for the printing of information on packages. The term digital printing refers to the electronic digital characters or electronic digital images that can be printed by an electronic output device capable of translating digital information. The two main digital printing technologies are ink jet and electrophotography.

The introduction of piezo impulse drop-on-demand (DOD) and thermal DOD ink jet printers in the early 1980's provided ink jet printing systems. These early printers were very slow, and the ink jet nozzles often clogged. In the 1990's Hewlett Packard introduced the first monochrome ink jet printer, and, shortly thereafter, the introduction of color, wide format ink jet printers enabled businesses to enter the graphic arts market. Today, a number of different ink jet technologies are being used for packaging, desktop, industrial, commercial, photographic, and textile applications.

In piezo technology, a piezo crystal is electrically stimulated to create pressure waves, which eject ink from the ink chamber. The ink can be electrically charged and deflected in a potential field, allowing the different characters to be created. More recent developments have introduced DOD multiple jets that utilize conductive piezo ceramic material, which, when charged, increases the pressure in the channel and forces a drop of ink from the end of the nozzle. This allows for very small droplets of ink to form and be delivered at high speed at very high resolution, approximately 1,000 dpi printing.

Until recently, the use of color pigments in jet inks was uncommon. However, this is changing rapidly. Submicron pigments were developed in Japan for ink jet applications. Use of pigments allows for more temperature resistant inks required for thermal ink jet printers and laminations. Pigmented water-based jet inks are commercially available, and UV-curable jet inks are in development. Pigmented inks have greater lightfastness and water-resistance.

Digital ink jet printing has the potential to revolutionize the printing industry by making short-run, color print jobs more economical. However, the next commercial stage will require significant improvements in ink jet technology; the major hurdle remaining is to improve print speed. Part of this problem is the limitation of the amount of data the printer can handle rapidly. The more complex the design, the slower the printing process. Right now they are about 10 times slower than comparable digital electrostatic printers.

Electrophotography was invented in the 1930's by Chester Carlson. By the early 1970's, the development of an electrophotographic color copier was being investigated by many companies. The technology for producing color copiers was already in place, but the market was not. It would take many more years until customer demand for color copies would create the necessary incentive to develop suitable electrostatic color copiers. By the late 1970's a few companies were using fax machines that could scan a document, reduce the images to electronic signals, send them out over the telephone wire, and, using another fax machine, retrieve the electronic signals and print the original image using heat-sensitive papers to produce a printed copy.

In 1993 Indigo and Xeikon introduced commercial digital printing machines targeted on short-run markets that were dominated by sheet-fed lithographic printers. Elimination of intermediate steps associated with negatives and plates used in offset printing provides faster turnaround and better customer service. These digital presses share some of the characteristics of traditional xerography but use very specialized inks. Unlike inks for conventional photocopiers, these inks are made with very small particle size components in the range of 1 $\mu$m. Dry toners used in xerography are typically 8–10 $\mu$m in size.

In 1995 Indigo introduced the Ominus press designed for printing flexible packaging products. The Ominus uses a digital offset color process called One Shot Color that has six colors. A key improvement has been the use of a special white Electro ink for transparent substrates. The Ominus web-fed digital printing system allows printing of various substrates using an offset cylinder that transfers the color image to the substrate. In principle, this allows perfect register regardless of the substrate being printed, paper, film, and metal can be printed by this process. This digital printing system is based on an electrophotographic process where the electrostatic image is created on the surface of a photoconductor by first charging the photo-conductor by charge corona and exposing the photoconductive surface to a light source in image fashion.

The charged electrostatic latent image is then developed using ink containing an opposite charge to that on the image. This part of the process is similar to that of electrostatic toners associated with photo-copying machines. The latent charged electrostatic image formed on the photoconductor surface is developed by means of electrophoretic transfer of the liquid toner. This electrostatic toner image is then transferred to a hot blanket, which coalesces the toner and maintains it in a tacky state until it is transferred to the substrate, which cools the ink and produces a tack-free print.

Electro inks typically comprise mineral oil and volatile organic compounds below that of conventional offset printing inks. They are designed so that the thermoplastic resin will fuse at elevated temperatures. In the actual printing process, the resin coalesced, the inks are transferred to the substrate, and there is no need to heat the ink to dry it. The ink is deposited on the substrate essentially dry, although it becomes tack-free as it cools and reaches room temperature.

For several decades a magnetic digital technology called "magnetography" has been under development. This process involves creating electrical images on a magnetic cylinder and using magnetic toners as inks to create the image. The potential advantage of this technology lies in its high press speed. Tests have shown speeds of 200 meters per minute. Although these magnetic digital printers are limited to black and white copy, developments of color magnetic inks would make this high-speed digital technology economically feasible. The key to its growth will be further development of the VHSM (very high speed magnetic) drum and the color magnetic inks.

Within the magnetic digital arena, a hybrid system called magnetolithography has been built and tested on narrow web and short-run applications developed by Nipson Printing Systems in Belfort, France. The technology appears to provide high resolution, and tests have been conducted using a silicon-based, high density, magnetographic head. Much more work is necessary in the ink development to bring this system to a competitive position relative to ink jet or electrophotography. However, the fact that it has high speed printing potential makes it an attractive alternate for packaging applications in which today's ink jet and electrophotography technologies are lagging.

There is a continuing need for high quality labels that can be printed from digital label files that contain graphics, text and images. Digital printing of labels takes advantage of the growing amount of label data that is resident in-digital files. Digital printing, as opposed to the analog flexographic printing of labels, also enables the use of distributive printing of label file. Distributive printing allows a digital label file to be created in one central location, sent to remote locations and printed on digital label printers.

Photographic materials have been known for use as prints for preserving memories for special events such as birthdays and vacations. They also have been utilized for large display materials utilized in advertising. These materials have been known as high quality products that are costly and somewhat delicate as they would be easily defaced by abrasion, water, or bending. Photographs are traditionally placed in frames, photo albums, and behind protective materials in view of their fragile and delicate nature, as well as their value. They are considered luxury items for the consumers to preserve a record of important events in their lives. They also have been considered as expensive display materials for advertising. In view of their status as luxury items, they have not been utilized in other areas of commerce.

Typically pressure sensitive labels are printed with printing inks. Printing inks, while providing good text and graphic quality, can not match the quality of a silver halide image. Conversely, silver halide, while providing excellent image quality, can only produce 60% of Pantone color space and therefore is limited. Bourdelais et al in U.S. Pat. No. 5,866,282 discusses imaging layers containing silver halide and dye forming couplers applied to a reflective polymer base for photographic output. While the output material in U.S. Pat. No. 6,030,756 provides an excellent image that can be viewed, the image is only capable of reproducing 60% of Pantone color space.

McInerney etal in U.S. Pat. Nos. 5,679,139; 5,679,140; 5,679,141; and 5,679,142 teach the shape of preferred subtractive dye absorption shapes for use in four color, C,M,Y,K based ink-jet prints.

McInerney et al in EP 0 825 488 teaches the shape of preferred subtractive cyan dye absorption shape for use in silver halide based color prints.

Kitchin et al in U.S. Pat. No. 4,705,745 teaches the preparation of a photographic element for preparing half-tone color proofs comprising four separate imaging layers capable of producing cyan, magenta, yellow, and black images.

Powers et al in U.S. Pat. No. 4,816,378, teaches an imaging process for the preparation of color half-tone images that contain cyan, magenta, yellow, and black images. The use of the black dye does little to improve the gamut of color reproduction.

Haraga et al in EP 0 915 374 A1 teaches a method for improving image clarity by mixing 'invisible' information in the original scene with a color print and reproducing it as an infrared dye, magenta dye, or as a mixture of cyan magenta and yellow dyes to achieve improved color tone and realism. The addition of the resulting infrared, magenta, or black dye does little to improve the gamut.

In spite of the foregoing teachings relative to color gamut, the coupler sets which have been employed in silver halide color imaging have not provided the range of gamut desired for modern digital imaging; especially for so-called 'spot colors', or 'HiFi colors' utilized in the field of packaging.

PROBLEM TO BE SOLVED BY THE INVENTION

There is a need for pressure sensitive labels for application to packages that are high in quality and at the same time economical for short runs. There is a further need for the printing of the labels from digital information files that has the image quality of silver halide and the Pantone color space of printed inks.

SUMMARY OF THE INVENTION

It is an object of the invention to provide higher quality images to packaging materials.

It is a further object to provide a silver halide imaging system labels that have bright and sharp images.

It is another object to provide a printed labels closer to the Pantone color space of printed inks.

It is a further object of the invention to provide labels that can be printed from digital files.

It is a further object of the invention to provide labels that can be printed using distributive printing methods.

These and other objects of the invention are accomplished by a photographic label comprising a pragmatic polymer sheet, at least one layer comprising an image comprising dyes formed from couplers above said pragmatic polymer sheet, and a lower strippable paper carrier, a pressure sensitive adhesive layer between said lower strippable carrier and said pragmatic polymer sheet, and an environmental protection layer overlaying at least one photosensitive layer wherein said carrier has exposed edges where it has a greater surface area than the pragmatic sheet and said image further comprises fiducial marks.

ADVANTAGEOUS EFFECT OF THE INVENTION

The invention provides improved image quality for packaging materials. The invention includes a printing method that can print text, graphic and images using an optical digital printing systems in combination with the Pantone color space of printed inks for the formation of a silver halide pressure sensitive label for packaging. The invention further provides labels that have a olfactory and tactile features to further enhance shelf awareness.

DETAILED DESCRIPTION OF THE INVENTION

The invention has numerous advantages over prior practices in the art. Recently there has been a trend in the marketing of mass consumer items to try to localize the marketing to separately approach smaller groups. These groups may be regional, ethnic, gender, age, or special interest differentiated. In order to approach these different groups, there is a need to provide packaging that is specifically directed to these groups. As discussed above, the traditional packaging materials are generally suited for very long runs of material and to form shorter runs or to provide rapid changes in packaging is impossible or very expensive. We have found silver halide based photographic materials that are suitable for packaging uses. Further, recently there has become available rapid photo processing apparatus suitable for short runs of material. There is also available silver halide processing apparatus that is capable of high speed relatively long continuous runs of material. The combination of low cost packaging suitable photographic material with the processing apparatus available for rapid short and long runs of material has resulted in the opportunity for silver halide material to be utilized in packaging materials. Silver halide materials that have properties such as flexibility, low cost, and the ability to flex and bend has resulted in materials satisfactory and suitable for packaging.

By combining the advantages of silver halide printing, mainly excellent image quality, short run economics and ability to print from a digital file with the Pantone color range of printed inks, the label of the invention overcomes the color space deficiency of silver halide printing. Further, by printing ink over the silver halide image, small text size that is frequently encountered in medical packaging applications, is improved over silver halide printing of text which at present seems to be limited to a four point text.

The utilization of the thin, flexible, and tough silver halide materials results in a packaging material having many superior properties. These materials are capable of having brighter, sharper, and higher color images that anything presently available in packaging. The packaging materials of the invention have a silver halide depth of image unsurpassed by existing packaging materials. The packaging materials of the invention may be further provided with a variety of packing materials that are suitable pressure sensitive labeling of packages such as shampoo bottles, perfume bottles and film boxes. The packaging materials of the invention while having the advantage of superior image are available on thin base materials which are low in cost while providing superior opacity and strength. The packaging materials of the invention as they may be imaged by flash optical exposure or digital printing have the ability to be formed in short runs and to be rapidly switched from one image to the next without delay.

The silver halide label materials of the invention allows packages to be rapidly designed and brought to market. For instance, significant events in sports or entertainment may be practically instantly brought to market as a digital image may be immediately flash exposed onto silver halide pressure sensitive labels and utilized within moments from the time of the event. This is in contrast to typical photogravure or flexographic imaging where lead times for pressure sensitive labels are typically several weeks. Further, the quality of the silver halide formed image lends itself to collectable images formed as a part of packaging much better than previous images which were of lower quality and were less desirable for collecting. Finally, the regional customization of images is rapidly possible.

The ability to rapidly change packaging also would find use in the need to provide regional labeling with different languages and marketing themes in different countries. Further, different countries have different legal labeling requirements as to content. For instance, alcoholic beverages such as wine and beer are subject to a wide variety of regional and national variations in labeling requirements. Wines manufactured in France may have long delays in shipping out of France due to the wait for national labeling in other countries. Photographic images also would be particularly desirable for premium products such as fine wines, perfumes, and chocolates, as they would be of high quality and reflect the high quality of the product in the package.

The invention provides a printing method that is economically viable when printing short runs as the cost of printing plates or printing cylinders are reduced as the number of cylinders to provide excellent image quality is reduced. The silver halide imaging layers provide superior images, especially flesh tone, and the printed inks can provide spot color, bar codes or text. Printing of the inks may be accomplished by flexography, ink jet or laser toner.

Silver halide image technology can simultaneously print text, graphics, and photographic quality images on the pressure sensitive label. Since the silver halide imaging layers of the invention are both optically and digitally compatible, text, graphics, and images can be printed using known digital printing equipment such as lasers and CRT printers. Because the silver halide system is digitally compatible, each package can contain different data enabling customization of individual packages without the extra expense of printing plates or cylinders. Further, printing digital files allows the files to be transported using electronic data transfer technology such as the internet thus reducing the cycle time to apply printing to a package. Silver halide imaging layers can be digitally exposed with a laser or CRT at speeds greater than 75 meters per minute allowing competitive printing speeds compared to current ink jet or electrophotographic printing engines. These and other advantages will be apparent from the detailed description below.

The terms as used herein, "top", "upper", "emulsion side", and "face" mean the side or toward the side of a photographic packaging label bearing the imaging layers. The term environmental protection layer means the layer applied to the post processed imaging layers. The terms "face stock" and "substrate" mean the material to which the silver halide layers are applied. The terms "bottom", "lower side", "liner" and "back" mean the side or toward the side of the photographic label or photographic packaging material opposite from the side bearing the photosensitive imaging layers or developed image.

In the field of product labeling and advertising, the ability of the printing technology to reproduce all of the colors in the Pantone color space is important. An example is the reproduction of corporate colors such as candy apple reds or lemon yellows that uniquely identify a product. Prior art printed ink system for labeling have utilized spot colors beyond red, green and blue inks to obtain the desired color. Silver halide printing systems are Pantone color space limited because silver halide using combinations of yellow, magenta and cyan dyes to form colors. At present approximately 70% of Patone color space can be replicated with a yellow, magenta and cyan dye based system. The invention material solves this problem by preferably applying additional color to the printed, developed silver halide formed image. A photographic article comprising a base material carrying at least one layer comprising a photographic image formed by combination of dyes formed from couplers wherein areas of said photo image are colored without dyes formed by couplers is preferred as gamut of silver halide can be expanded.

One preferred method of providing an expanded silver halide dye gamut is providing a non-neutral color to the base material. By providing non-neutral, or a colored background to the base material, a single color background and be utilized to form the silver halide image of the invention. Further, because the dyes utilized in silver halide imaging printing systems are semi transparent, background color can effectively blend with color formed by silver halide dyes. An example of a colored background would be the addition of a candy apple red tint to the base material. By forming a silver halide image on top of the candy apple red base, the dye gamut of the silver halide system is expanded to include candy apple red. The background color becomes part of the image by not exposing the silver halide grain in the intended areas and the background color can be eliminated by exposing the silver halide imaging system to form black.

Another preferred method for the expansion of the silver halide color space is by printing and developing the silver halide image and subsequently printing color on top of the silver halide formed image. This method is preferred as printing inks common to the printing industry can be used to expand the color gamut of the silver halide formed image. Over printing with dye based ink allow color formation with the silver halide formed dyes thus expanding the color space of the silver halide dyes. Over printing with pigmented inks, create expanded color without utilizing the native colors of the silver halide formed image below the pigment printing ink.

In another embodiment, the base material preferably is printed with indicia. By printing the base material with indicia, the text size limitation of silver halide is overcome as printed text is legiable to 2 points. Further, by printing black text on the base material, the silver halide imaging system utilized for printing can be low contrast which significantly improves flesh tones. Improved flesh tones, especially on advertising labels has significant commercial value as flesh tones comprising printed inks are low in quality.

In a further embodiment of the invention, the indicia on the base preferably forms an image. A printed image on the base provides an expanded color space compared to silver halide: Further, by printing blacks on the base, the maximum density of the silver halide formed image can be greatly improved. Additionally, by printing a image on the base, formation of a silver halide formed image in registration with the silver halide image allows for a fourth process color complimentary to the silver halide image thereby greatly expanding the color space of the silver halide formed image.

In another embodiment of the invention, the indicia located on the base forms a pattern. An indicia formed pattern is preferred as the pattern can comprise colors that are outside of the silver halide formed image. Further, the indicia formed pattern using pigmented printing inks for example, can form an interference pattern with the silver halide formed image to create a unique look for labeling and advertising. The pattern preferably is machine readable. A machine readable pattern, allows for the creation of security labels that could be sued to deter shop lifting and can be used for inventory control by forming a bar code.

By overprinting in the low density areas of the silver halide formed image, the overprinting inks can be preferably printed on low density areas of the silver halide formed image. Printing on the low density areas of the silver halide formed image allows for maximum contrast between the printed inks and the low density areas of the silver halide formed image. By improving contrast of the overprinted inks, image quality is improved, text quality is improved and lower ink utilization is possible compared to printing over high density areas of the silver halide formed image.

A dot gain of less than 20% is preferred for printing on top of the silver halide formed image. A dot gain of more than 25% results is low quality images that are not sharp and are not consistent with the high quality silver halide formed image below. Further, a printing ink dot gain of more than 25% has been shown to reduce the machine readability of bar codes that are printed on top of the silver halide formed image. A printing dot gain of less that 10% is preferred as a dot gain of less than 10% forms a high quality image consistent with the silver halide image below the printed inks. A combination of printing ink chemistry and protective over coat chemistry for the silver halide formed image preferably allows the printing to mordant into the over coat layer for the silver halide formed image. By allowing the printing inks to mordant into the top most silver halide formed image layer, the printed inks will not migrate into the silver halide formed image to negatively react with the silver halide formed dye which could result in a significant loss in image quality.

The addition of a fiducial mark to the silver halide formed image is preferred as the fiducial mark provides a means for die cutting the image to create a label. The addition of a fiducial mark allows the photographic article to be die cut using optical sensors to read the registration of the image. The fiducial mark bay be printed on the base material, printed using silver halide formed images or post process printed using printed inks. In another embodiment, the fiducial mark is created utilizing a mechanical means such as punched hole, mechanical embossing or a partial punched hole to create a topographical difference in the silver halided formed image. A mechanical fiducial mark allows for mechanical sensors to be used for die cutting, application of a spot printed color or for locating a label on a package during a automated labeling.

In another embodiment of the invention, the silver halide formed image is preferably over laminated with a preprinted sheet. By pre-printing a over lamination sheet with images, text or non-neutral color, the color space of the silver halide formed image is expanded. Further, over laminating also protects the delicate silver halide formed image from abrasion, water and handling damage that frequently occurs for packaging labels.

In a further embodiment of the invention, the photo image is preferably colored with magnetic recording materials. By coloring the image with magnetic recording materials, the photographic article can contain both visual information and magnetic information. Magnetic information can be utilized for product identification, storage of product information that is machine readable by retailers or consumers or as a means of providing a security feature. A magnetic recording layer can be used to record photographic processing information such as date and time of processing, voice or data from the capture device, or can be used to store a digital file of the printed image. More specifically, the colored magnetic recording layer of the invention increases the optical density of the backside biaxially oriented sheet by less than 0.2 optical density units across the visible portion of the spectrum from 400 nm to 700 nm. In forming the transparent magnetic recording layer, magnetic particles with a surface area of 30 $m^2$/gram are applied in a coated layer having a dried thickness less than 1.5 micrometers. The magnetic particles are homogeneously dispersed in a transparent binder and a solvent for the binder. An example of a magnetic binder is cellulose organic acid esters. Suitable solvents include methylene chloride, methyl alcohol, methyl ethyl ketone, methyl isobutyl ketone, ethyl acetate, butyl acetate, cyclohexanone, butyl alcohol, and mixtures thereof. The dispersing medium can also contain transparent addenda such as plasticizers and dispersing agents.

Suitable printing inks for this invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion styrene-maleic anhydride resins, and other synthetic polymers. Examples of radiation cured inks include ultraviolet and electron beam inks. The preferred ink systems for printing indicia are water based inks and radiation cured inks because of the need to reduce volatile organic compounds associated with solvent based ink systems.

In order to produce a pressure sensitive photographic label with expanded color gamut, the liner material that carries the pressure sensitive adhesive, face stock and silver halide imaged layers, the liner material must allow for efficient transport in manufacturing, image printing, image development, label converting and label application equipment. A label comprising a silver halide imaging layer, a base and a strippable liner adhesively connected by an adhesive to said base, wherein said base has a stiffness of between 15 and 60 millinewtons and an L* is greater than 92.0, and wherein said liner has a stiffness of between 40 and 120 millinewtons is preferred. The photographic label with expanded color gamut of the invention is preferred as the white, stiff liner allows for efficient transport through photographic printing and processing equipment and improves printing speed compared to typical liner materials that are brown or clear and have little contribution to secondary exposure.

A peelable liner or back is preferred as the pressure sensitive adhesive required for adhesion of the label to the package, can not be transported through labeling equipment without the liner. The liner provides strength for conveyance and protects the pressure sensitive adhesive prior to application to the package. A preferred liner material is cellulose paper. A cellulose paper liner is flexible, strong and low in cost compared to polymer substrates. Further, a cellulose paper substrate allows for a textured label surface that can be desirable in some packaging applications. The paper may be provided with coatings that will provide waterproofing to the paper as the photographic element of the invention must be processed in aqueous chemistry to develop the image. An examples of a suitable water proof coatings applied to the paper are acrylic polymer, melt extruded polyethylene and oriented polyolefin sheets laminated to the paper. Paper is also preferred as paper can contain moisture and salt which provide antistatic properties that prevent static sensitization of the silver halide image layers.

Further, paper containing sizing agents, known in the photographic paper art and disclosed in U.S. Pat. No. 6,093,521, provide resistance to edge penetration of the silver halide image processing chemistry. An edge penetration of less than 8 mm is preferred as processing chemistry penetrated into the paper greater than 12 mm has been shown to swell causing die cutting problems when face stock matrix is die cut and stripped from the liner. Also, penetration of processing chemistry greater than 12 mm increases the chemistry usage in processing resulting in a higher processing costs.

Another preferred liner material or peelable back is an oriented sheet of polymer. The liner preferably is an oriented polymer because of the strength and toughness developed in the orientation process. Preferred polymers for the liner substrate include polyolefins, polyester and nylon. Preferred polyolefin polymers include polypropylene, polyethylene, polymethylpentene, polystyrene, polybutylene, and mixtures thereof. Polyolefin copolymers, including copolymers of propylene and ethylene such as hexene, butene, and octene are also useful. Polyester is most preferred, as it has desirable strength and toughness properties required for efficient transport of silver halide pressure sensitive label liner in high speed labeling equipment.

In another preferred embodiment, the liner consists of a paper core to which sheets of oriented polymer are laminated. The laminated paper liner is preferred because the oriented sheets of polymer provide tensile strength which allows the thickness of the liner to be reduced compared to coated paper and the oriented polymer sheet provides resistance to curl during manufacturing and drying in the silver halide process.

The tensile strength of the liner or the tensile stress at which a substrate breaks apart is an important conveyance and forming parameter. Tensile strength is measured by ASTM D882 procedure. A tensile strength greater than 120 MPa is preferred as liners less than 110 MPa begin to fracture in automated packaging equipment during conveyance, forming and application to the package.

The coefficient of friction or COF of the liner bearing the silver halide imaging layer is an important characteristic as the COF is related to conveyance and forming efficiency in automated labeling equipment. COF is the ratio of the weight of an item moving on a surface to the force that maintains contact between the surface and the item. The mathematical expression for COF is as follows:

$COF=\mu=$(friction force/normal force)

The COF of the liner is measured using ASTM D-1894 utilizing a stainless steel sled to measure both the static and dynamic COF of the liner. The preferred COF for the liner of the invention is between 0.2 and 0.6. As an example, a 0.2 COF is necessary for coating on a label used in a pick-and-place application. The operation using a mechanical device to pick a label and move it to another point requires a low COF so the label will easily slide over the surface of the label below it. At the other extreme, large sheets such as book covers require a 0.6 COF to prevent them from slipping and sliding when they are piled on top of each other in storage. Occasionally, a particular material may require a high COF on one side and a low COF on the other side. Normally, the base material itself, such as a plastic film, foil, or paper substrate, would provide the necessary COF for one side. Application of an appropriate coating would modify the image side to give the higher or lower value. Conceivably, two different coatings could be used with one on either side. COF can be static or kinetic. The coefficient of static friction is the value at the time movement between the two surfaces is ready to start but no actual movement has occurred. The coefficient of kinetic friction refers to the case when the two surfaces are actually sliding against each other at a constant rate of speed. COF is usually measured by using a sled placed on the surface. The force necessary at the onset of sliding provides a measurement of static COF. Pulling the sled at a constant speed over a given length provides a measure of kinetic frictional force.

The preferred thickness of the liner of the invention is between 75 and 225 micrometers. Thickness of the liner is important in that the strength of the liner, expressed in terms of tensile strength or mechanical modulus, must be balanced with the thickness of the liner to achieve a cost efficient design. For example, thick liners that are high in strength are not cost efficient because thick liners will result in short roll lengths compared to thin liners at a given roll diameter. A liner thickness less that 60 micrometers has been shown to cause transport failure in the edge guided silver halide printers. A liner thickness greater than 250 micrometers yields a design that is not cost effective and is difficult to transport in existing silver halide printers.

The liner of the invention preferably has an optical transmission of less than 20%. During the printing of the silver halide labels, exposure light energy is required to reflect from the face stock/liner combination to yield a secondary exposure. This secondary exposure is critical to maintaining high level of printing productivity. It has been shown that liners with an optical transmission of greater than 25% significantly reduces the printing speed of the silver halide label. Further, clear face stock material to provide the "no label look" need an opaque liner to not only maintain printing speed, but to prevent unwanted reflection from printing platens in current silver halide printers.

Since the light sensitive silver halide layers with expanded color gamut can suffer from unwanted exposure from static discharge during manufacturing, printing and processing, the liner preferably has a resistivity of less than $10^{11}$ ohms/square. A wide variety of electrically-conductive materials can be incorporated into antistatic layers to produce a wide range of conductivities. These can be divided into two broad groups: (i) ionic conductors and (ii) electronic conductors. In ionic conductors charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during processing, resulting in a loss of antistatic function. The conductivity of antistatic layers employing an electronic conductor depends on electronic mobility rather than ionic mobility and is independent of humidity. Antistatic layers which contain conjugated polymers, semiconductive metal halide salts, semiconductive metal oxide particles, etc. have been described previously. However, these antistatic layers typically contain a high volume percentage of electronically conducting materials which are often expensive and impart unfavorable physical characteristics, such as color, increased brittleness, and poor adhesion to the antistatic layer.

In a preferred embodiment of this invention the label has an antistat material incorporated into the liner or coated on the liner. It is desirable to have an antistat that has an electrical surface resistivity of at least $10^{11}$ log ohms/square. In the most preferred embodiment, the antistat material comprises at least one material selected from the group consisting of tin oxide and vanadium pentoxide.

In another preferred embodiment of the invention antistatic material are incorporated into the pressure sensitive adhesive layers. The antistatic material incorporated into the pressure sensitive adhesive layer provides static protection to the silver halide layers and reduces the static on the label which has been shown to aid labeling of containers in high speed labeling equipment. As a stand-alone or supplement to the liner comprising an antistatic layer, the pressure sensitive adhesive may also further comprise an antistatic agent selected from the group consisting of conductive metal oxides, carbon particles, and synthetic smectite clay, or multi-layered with an inherently conductive polymer. In one of the preferred embodiments, the antistat material is metal oxides. Metal oxides are preferred because they are readily dispersed in the thermoplastic adhesive and can be applied to the polymer sheet by any means known in the art. Conductive metal oxides that may be useful in this invention are selected from the group consisting of conductive particles including doped-metal oxides, metal oxides containing oxygen deficiencies, metal antimonates, conductive nitrides, carbides, or borides, for example, $TiO_2$, $SnO_2$, $Al_2O_3$, $ZrO_3$, $In_2O_3$, $MgO$, $ZnSb_2O_6$, $InSbO_4$, $TiB_2$, $ZrB_2$, $NbB_2$, $TaB_2$, $CrB_2$, $MoB$, $WB$, $LaB_6$, $ZrN$, $TiN$, $TiC$, and $WC$. The most preferred materials are tin oxide and vanadium pentoxide because they provide excellent conductivity and are transparent.

In order to provide a digital printing technology that can be applied to a package that is high in quality, can handle text, graphic and images, is economical for short run printing jobs and accurately reproduce flesh tones, silver halide imaging is preferred. The silver halide technology can be either black and white or color. The silver halide imaging layers are preferably exposed and developed prior to application to a package. The flexible substrate of the invention contains the necessary tensile strength properties and coefficient of friction properties to allow for efficient transport and application of the images in high speed labeling equipment. The substrate of the invention is formed by applying light sensitive silver halide imaging layers of a flexible label stock that contains a pressure sensitive adhesive. The imaging layers, face stock and pressure sensitive adhesive are supported and transported through labeling equipment using a tough liner material. Because the light sensitive silver halide imaging layers are vulnerable to environmental solvents such as water, coffee and hand oils, an environmental protection layer is preferably applied to the light sensitive silver halide imaging layers after image development.

A method of forming a label comprising providing a pragmatic polymer sheet, at least one layer comprising at least one image forming layer comprising photosensitive silver halide grains and dye forming coupler above said pragmatic polymer sheet, and a lower strippable paper carrier, a pressure sensitive adhesive layer between said lower strippable carrier and said pragmatic polymer sheet, wherein said carrier has exposed edges where it has a greater surface area than the pragmatic sheet and said image further comprises fiducial marks and said at least one layer comprising said photosensitive silver halide grains has an exposure time to obtain a usable Dmax of 1.5 of less than 0.01 seconds, imaging an image and fiducial marks onto said imaged layer at an exposure time of less than 0.01 seconds, developing the image and fiducial marks in less than 50 seconds, drying said image at less than 70° C., applying an environmental protection layer over said image, dye cutting said imaged material to form labels on said carrier, removing the non-label pragmatic sheet from around said label is preferred. By providing an environmental protection to the silver halide imaging layers, the delicate silver halide imaged formed in a gelatin matrix is protected from water, solvents and the like. The environmental protection layer also provides scratch protection to the label so that scratches that frequently occur during product handling prior to stocking on store shelves, do not reduce the quality of the image or the perceived quality of the packaged consumer goods.

The environmental protection layer may consist of suitable material that protects the image from environmental solvents, resists scratching and does not interfere with the image quality. The environmental protection layer is preferably applied to the photographic image after image development because the liquid processing chemistry required for image development must be able to efficiently penetrate the surface of the imaging layers to contact the silver halide and couplers utilizing typical silver halide imaging processes. The environmental protection layer would be generally impervious to developer chemistry. An environmental protection layer where transparent polymer particles are applied to the top most surface of the imaging layers in the presence of an electric field and fused to the top most layer causing the transparent polymer particles to form a continuous polymeric layer is preferred. An electrophotographic toner applied polymer is preferred as it is an effective way to provide a thin, protective environmental layer to the photographic label that has been shown to withstand environmental solvents and damage due to handling.

In another embodiment, the environmental protection layer is coatable from aqueous solution, which survives exposure and processing, and forms a continuous, water-impermeable protective layer in a post-process fusing step. The environmental protection layer is preferably formed by coating polymer particles of 0.1 to 50 μm in average size together with a polymer latex binder on the emulsion side of a sensitized photographic product. Optionally, a small amount of water-soluble coating aids (viscosifiers, surfactants) can be included in the layer, as long as they leach out of the coating during processing. After exposure and processing, the product with image is treated in such a way as to cause fusing and coalescence of the coated polymer beads, by heat and/or pressure (fusing), solvent treatment, or other means so as to form the desired continuous, water impermeable protective layer.

Examples of suitable polymers from which the polymer particles used in environmental protection layer can be selected include poly(vinyl chloride), poly(vinylidene chloride), poly(vinyl chloride-co-vinylidene chloride), chlorinated polypropylene, poly(vinyl chloride-co-vinyl acetate), poly(vinyl chloride-co-vinyl acetate-co-maleic anhydride), ethyl cellulose, nitrocellulose, poly(acrylic acid) esters, linseed oil-modified alkyd resins, rosin-modified alkyd resins, phenol-modified alkyd resins, phenolic resins, polyesters, poly(vinyl butyral), polyisocyanate resins, polyurethanes, poly(vinyl acetate), polyamides, chroman resins, dammar gum, ketone resins, maleic acid resins, vinyl polymers, such as polystyrene and polyvinyltoluene or copolymer of vinyl polymers with methacrylates or acrylates, poly(tetrafluoroethylene-hexafluoropropylene), low-molecular weight polyethylene, phenol-modified pentaerythritol esters, poly(styrene-co-indene-co-acrylonitrile), poly(styrene-co-indene), poly(styrene-co-acrylonitrile), poly(styrene-co-butadiene), poly(stearyl methacrylate) blended with poly(methyl methacrylate), copolymers with siloxanes and polyalkenes. These polymers can be used either alone or in combination. In a preferred embodiment of the invention, the polymer comprises a polyester or poly (styrene-co-butyl acrylate). Preferred polyesters are based on ethoxylated and/or propoxylated bisphenol A and one or more of terephthalic acid, dodecenylsuccinic acid and fumaric acid as they form an acceptable environmental protection layer that generally survives the rigors of a packaging label.

To increase the abrasion resistance of the environmental protection layer, polymers which are cross-linked or branched can be used. For example, poly(styrene-co-indene-co-divinylbenzene), poly(styrene-co-acrylonitrile-co-divinylbenzene), or poly(styrene-co-butadiene-co-divinylbenzene) can be used.

The polymer particles for the environmental protection layer should be transparent, and are preferably colorless. But it is specifically contemplated that the polymer particle can have some color for the purposes of color correction, or for special effects, so long as the image is viewable through the overcoat. Thus, there can be incorporated into the polymer particle dye which will impart color. In addition, additives can be incorporated into the polymer particle which will give to the overcoat desired properties. For example, a UV absorber can be incorporated into the polymer particle to make the overcoat UV absorptive, thus protecting the image from UV induced fading or blue tint can be incorporated into the polymer particle to offset the native yellowness of the gelatin used in the silver halide imaging layers.

In addition to the polymer particles which form the environmental protection layer there can be combined with the polymer composition other particles which will modify the surface characteristics of the element. Such particle are solid and nonfusible at the conditions under which the polymer particles are fused, and include inorganic particles, like silica, and organic particles, like methylmethacrylate beads, which will not melt during the fusing step and which will impart surface roughness to the overcoat.

The surface characteristics of the environmental protection layer are in large part dependent upon the physical characteristics of the polymer which forms the toner and the presence or absence of solid, nonfusible particles. However, the surface characteristics of the overcoat also can be modified by the conditions under which the surface is fused. For example, the surface characteristics of the fusing member that is used to fuse the toner to form the continuous overcoat layer can be selected to impart a desired degree of smoothness, texture or pattern to the surface of the element. Thus, a highly smooth fusing member will give a glossy surface to the imaged element, a textured fusing member will give a matte or otherwise textured surface to the element, a patterned fusing member will apply a pattern to the surface of the element.

Suitable examples of the polymer latex binder include a latex copolymer of butyl acrylate, 2-acrylamido-2-methylpropanesulfonate, and acetoacetoxyethylmethacrylate. Other latex polymers which are useful include polymers having a 20 to 10,000 nm diameter and a Tg of less than 60° C. suspended in water as a colloidal suspension.

Examples of suitable coating aids for the environmental protection layer include any water soluble polymer or other material that imparts appreciable viscosity to the coating suspension, such as high MW polysaccharide derivatives (e.g. xanthan gum, guar gum, gum acacia, Keltrol (an anionic polysaccharide supplied by Merck and Co., Inc.) high MW polyvinyl alcohol, carboxymethylcellulose, hydroxyethylcellulose, polyacrylic acid and its salts, polyacrylamide, etc). Surfactants include any surface active material that will lower the surface tension of the coating preparation sufficiently to prevent edge-withdrawal, repellencies, and other coating defects. These include alkyloxy- or alkylphenoxypolyether or polyglycidol derivatives and their sulfates, such as nonylphenoxypoly(glycidol) available from Olin Matheson Corporation or sodium octylphenoxypoly(ethleneoxide)sulfate, organic sulfates or sulfonates, such as sodium dodecyl sulfate, sodium dodecyl sulfonate, sodium bis(2-ethylhexyl)sulfosuccinate (Aerosol OT), and alkylcarboxylate salts such as sodium decanoate.

In another embodiment, the environmental protection layer in the form of a continuous protective overcoat is applied over an imaged silver halide based label having at least one silver halide light-sensitive emulsion layer; and comprises a mixture of a vinyl polymer and a urethane polymer such that, it provides environmental protection of the imaged photographic element and excellent gloss characteristics. The environmental protection layer is composed of at least two polymers derived from aqueous dispersions of a vinyl polymer and a urethane polymer to ensure crack free and substantially curl free water-resistant coatings at dry coverages of less than 10.76 g/m$^2$. The urethane polymer when coated in the absence of the vinyl polymer has an indentation modulus less than 0.6 GPa in a layer less than 10 micrometers in thickness The amount of the urethane polymer in the environmental protection layer can vary from 10 to 65 weight percent. In accordance with a preferred form of the present invention, a packaging label comprises in order an upper environmental protection layer, an image preferably formed by means of silver halide, a base, an adhesive, a bottom peelable back wherein said environmental protection layer comprises a vinyl polymer and a urethane polymer wherein said urethane polymer in the absence of the vinyl polymer has an indentation modulus less than 0.6 GPa in a layer less than 10 micrometers in thickness.

The environmental protection layer as described above comprises a urethane polymer preferably, an aliphatic polyurethane in addition to a vinyl polymer. These urethane polymers are characterized as those having an indentation modulus less than 0.6 GPa measured using Hysitron nanoindenter equipped with a 2 micrometer radius spherical diamond indenter. This physical property requirement ensures that the environmental protection layer is compliant enough to provide a crack free overcoat in conjunction with the vinyl polymer in a coating thickness less than 10 micrometers in thickness. The environmental protection layer is preferably coated from a coating formula containing from about 10 to about 65 weight percent of urethane polymer and 35–90 weight percent of vinyl polymer to give a dry coverage of less than 10.76 g/m$^2$. The dry coverage of the topcoat layer is preferably from about 1.08 to 4.31 g/m$^2$.

The urethane polymer may be either organic solvent soluble or aqueous dispersible. For environmental reasons and for compatibility with gelatin, aqueous dispersible urethane polymers are preferred. Preparation of aqueous polyurethane dispersions is well-known in the art and involves chain extending an aqueous dispersion of a prepolymer containing terminal isocyanate groups by reaction with a diamine or diol. The prepolymer is prepared by reacting a polyester, polyether, polycarbonate, or polyacrylate having terminal hydroxyl groups with excess polyfunctional isocyanate. This product is then treated with a compound that has functional groups that are reactive with an isocyanate, for example, hydroxyl groups, and a group that is capable of forming an anion, typically this is a carboxylic acid group. The anionic groups are then neutralized with a tertiary amine to form the aqueous polymer dispersion.

Examples of urethane polymers useful in the present invention that are commercially available are NeoRez R600 and NeoRezR972 both from NeoResins (a division of Avecia). These are aliphatic polyester based polyurethanes. Of these NeoRez R 600 is preferred.

The environmental protection layer of this embodiment also comprises a vinyl polymer. Suitable vinyl polymers useful for the present invention include those obtained by polymerizing one or more ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene-malonates, ethylene, propylene and other alkylenes, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrene carboxylic acid. Suitable polyethylenically unsaturated monomers include butadiene, isoprene, allylmethacrylate, and diacrylates of alkyl diols such as butanediol diacrylate and hexanediol diacrylate, divinyl benzene and the like.

In this particular embodiment, the vinyl polymers of the overcoat formulation for the environmental protection layer of the present invention is preferably derived from acrylic polymers that have the advantage of good adhesion, non-yellowing, are adjustable for high gloss and have a wide range of glass transition and minimum film forming temperatures. Other vinyl polymers of choice include the vinyl-urethane hybrid polymers. In such vinyl hybrid polymers, the urethane component provides advantageous properties such as good film-formation, good chemical resistance, abrasion-resistance, toughness, elasticity and durability. The vinyl-urethane hybrid polymers (copolymers or interpenetrating networks) are very different from blends of the two.

Such polymers are prepared by polymerizing vinyl addition monomers in the presence of a polyurethane prepolymer or a chain extended polyurethane as described in U.S. Pat. No. 5,695,920. Polymerization of the vinyl monomer in the presence of the polyurethane component of the vinyl-urethane hybrid polymer, causes the two polymers to reside in the same latex particle as an interpenetrating or semi-interpenetrating network or as a core shell particle resulting in improved resistance to water, organic solvents and environmental conditions, improved tensile strength and modulus of elasticity. The overcoat layer in accordance with this invention is particularly advantageous due to superior physical properties including excellent resistance to water permeability, fingerprinting, fading and yellowing, exceptional transparency and toughness necessary for providing resistance to scratches, abrasion and blocking.

Some examples of vinyl-urethane hybrid copolymers used as the vinyl polymer in the environmental protection layer of this invention that are commercially available are the acrylic-urethane hybrid polymers such as NeoPac R-9000, R-9699 and R-9030 from Zeneca Resins, the SancureAU4010 from BF Goodrich, and the Hybridur 570 from Air Products. Examples of vinyl polymers useful in the practice of this invention are the commercially available acrylic polymers NeoCryl A1110, A1120, A5090, A6037, A6075, A6092, A625, A633, A650 and A655. An example of a vinyl polymer derived from an olefin useful in the practice that is commercially available is a polyethylene dispersion, Chem Corr Emulsion 260 obtained from the Chemical Corporation of America.

The environmental protection layer should be clear, i.e., transparent, and is preferably colorless. But it is specifically contemplated that the environmental protection layer can have some color for the purposes of color correction, or for special effects, so long as it does not detrimentally affect the formation or viewing of the image through the overcoat. Thus, there can be incorporated into the polymer, dyes that will impart color. In addition, additives can be incorporated into the polymer that will give to the overcoat, desired properties. Other additional compounds may be added to the coating composition, depending on the functions of the particular layer, including surfactants, emulsifiers, coating aids, lubricants, matte particles, rheology modifiers, crosslinking agents, antifoggants, inorganic fillers such as conductive and nonconductive metal oxide particles, pigments, magnetic particles, biocide, and the like. The coating composition may also include a small amount of organic solvent, preferably the concentration of organic solvent is less than 1 percent by weight of the total coating composition. The invention does not preclude coating the desired polymeric material from a volatile organic solution or from a melt of the polymer.

Optionally, the coating composition in accordance with the invention may also contain suitable crosslinking agents as described above. Such an additive can improve the adhesion of the overcoat layer to the substrate below as well as contribute to the cohesive strength of the layer. Crosslinkers such as epoxy compounds, polyfunctional aziridines, methoxyalkyl melamines, triazines, polyisocyanates, carbodiimides, polyvalent metal cations, and the like may all be considered. The preferred crosslinker is a polyfunctional aziridine crosslinker. The crosslinking agent can be used at about 0.5 to about 15 weight percent based on the total polymer. However, a crosslinking agent concentration of about 0.5 to 5 weight percent is preferred.

Matte particles well known in the art may also be used in the coating composition of the invention, such matting agents have been described in *Research Disclosure* No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include, hydroxyl, carboxyl, carbodiimide, epoxide, aziridine, vinyl sulfone, sulfinic acid, active methylene, amino, amide, allyl, and the like.

In order to reduce the sliding friction of the photographic elements in accordance with this invention, the vinyl-urethane hybrid polymers may contain fluorinated or siloxane-based components and/or the coating composition may also include lubricants or combinations of lubricants. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patent Nos. 1,263,722; 1,198,387; 1,430,997; 1,466,304; 1,320,757; 1,320,565; and 1,320,756; and in German Patent Nos. 1,284,295 and 1,284,294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly(tetrafluoroethylene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. Lubricants useful in the present invention are described in further detail in *Research Disclosure* No.308119, published December 1989, page 1006.

Examples of coating aids include surfactants, viscosity modifiers and the like. Surfactants include any surface-active material that will lower the surface tension of the coating preparation sufficiently to prevent edge-withdrawal, repellencies, and other coating defects. These include alkyloxy- or alkylphenoxypolyether or polyglycidol derivatives and their sulfates, such as nonylphenoxypoly(glycidol) available from Olin Matheson Corporation or sodium octylphenoxypoly(ethyleneoxide)sulfate, organic sulfates or sulfonates, such as sodium dodecyl sulfate, sodium dodecyl sulfonate, sodium bis(2-ethylhexyl)sulfosuccinate (Aerosol OT), and alkylcarboxylate salts such as sodium decanoate.

The application of a ultraviolet polymerizable monomers and oligomers to the outermost layer of the developed silver halide imaging layers and subsequent radiation exposure to form a thin cross-linked protective layer is preferred. UV cure polymers are preferred as they can easily be applied to the outermost layer of the silver halide imaging layers and have been shown to provide an acceptable protective layer for the silver halide label material. Preferred UV cure polymers include aliphatic urethane, allyl methacrylate, ethylene glycol dimethacrylate, polyisocyanate and hydroxyethyl methacrylate. A preferred photoinitiator is benzil dimethyl ketal. The preferred intensity of radiation is between 0.1 and 1.5 milliwatt/cm$^2$. Below 0.05, insufficient cross linking occurs yielding a protective layer that does not offer sufficient protection for the labeling of packages.

In another embodiment of this invention, the environmental protection layer is composed of an ultraviolet (UV) radiation cured polymeric layer coated over a primer layer and provides water-resistant coatings. It has been found that if the UV cured polymer is used alone without the primer layer, adhesion of the environmental protection layer to the hydrophilic imaging layer below is compromised.

UV curable compositions useful in this embodiment may be of two major types of curing chemistries, free radical chemistry and cationic chemistry. Acrylate monomers (reactive diluents) and oligomers (reactive resins) are the primary components of the free radical based formulations, giving the cured coating most of its physical characteristics. Photoinitiators are required to absorb the UV light energy, destabilize to form free radicals, and attack the acrylate group C=C double bond to initiate polymerization. Cationic chemistry utilizes cycloaliphatic epoxy resins and vinyl ether monomers as the primary components. Photoinitiators absorb the UV light to form a Lewis acid, which attacks the epoxy ring initiating polymerization.

The ultraviolet polymerizable monomers and oligomers are applied to the primer layer on the outermost layer of the developed silver halide imaging layers and subsequently exposed to UV radiation to form a thin cross-linked protective layer. The preferred UV cure absorbance energy is between 10 and 150 mJ/cm$^2$.

Some examples of UV curable systems used in the environmental protection layer of this invention that are commercially available are RD1020, and RD1200, both acrylate based monomers and oligomers from R&D Coatings, Inc., Radcure 504W and Radcure 159SLV, also acrylate based monomers and oligomers from Rad-Cure corporation, L533-119, from QureTech, and Imagegard FP-3/MF-1, an epoxy based overcoat composition from Dalcor Products Company, Inc.

The application of a pre-formed polymer layer to the outermost surface of the developed label silver halide image to form an environmental protection layer is most preferred. Application of a pre-formed sheet is preferred because pre-formed sheets are tough and durable easily withstanding the environmental solvents and handling forces applied to the silver halide imaged label. Application of the pre-formed polymer sheet is preferable carried out though lamination after image development. An adhesive is applied to either the photographic label or the pre-formed polymer sheet prior to a pressure nip that adheres the two surfaces and eliminates any trapped air that would degrade the quality of the image.

The pre-formed sheet preferably is an oriented polymer because of the strength and toughness developed in the orientation process. Preferred polymers for the flexible substrate include polyolefins, polyester and nylon. Preferred polyolefins include polypropylene, polyethylene, polymethylpentene, polystyrene, polybutylene, and mixtures thereof Polyolefin copolymers, including copolymers of propylene and ethylene such as hexene, butene, and octene are also useful. Polypropylene is most preferred, as it is low in cost and has desirable strength and toughness properties required for a pressure sensitive label.

The application of a synthetic latex to the developed silver halide label image is another preferred environmental protection layer. A coating of synthetic latex has been shown to provide an acceptable environmental protection layer and can be coated in an aqueous solution eliminating exposure to solvents. The coating of latex has been shown to provide an acceptable environmental protection layer for the silver halide packaging label. Preferred synthetic latexes for the environmental protection layer are made by emulsion polymerization techniques from styrene butadiene copolymer, acrylate resins, and polyvinyl acetate. The preferred particles size for the synethetic latex ranges from 0.05 to 0.15 µm. The synthetic latex is applied to the outermost layer of the silver halide imaging layers by known coating methods that include rod coating, roll coating and hopper coating. The synthetic latexes must be dried after application and must dry transparent so as not to interfere with the quality of the silver halide image.

While silver halide images are preferred for the above mentioned reasons, the environmental protection layer of the invention may also be utilized with other imaging materials such as ink jet, thermal, electrophotographic and the like. It particularly finds use with those materials that have a water soluble colloidal binder such as gelatin, polyvinyl alcohol etc.

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

An ink jet recording element typically comprises a support having on at least one surface thereof an ink-receiving or image-forming layer. The ink-receiving layer may be a polymer layer which swells to absorb the ink or a porous layer which imbibes the ink via capillary action.

Ink jet prints, prepared by printing onto ink jet recording elements, are subject to environmental degradation. They are especially vulnerable to water smearing, dye bleeding, coalescence and light fade. For example, since ink jet dyes are water-soluble, they can migrate from their location in the image layer when water comes in contact with the receiver after imaging. Highly swellable hydrophilic layers can take an undesirably long time to dry, slowing printing speed, and will dissolve when left in contact with water, destroying printed images. Porous layers speed the absorption of the ink vehicle, but often suffer from insufficient gloss and severe light fade.

A binder may also be employed in the image-receiving layer in the invention. In a preferred embodiment, the binder is a water soluble colloidal polymer. Examples of water soluble colloidal polymers useful in the invention include poly(vinyl alcohol), polyvinylpyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate-co-vinyl alcohol), poly(acrylic acid), poly(1-vinylpyrrolidone), poly(sodium styrene sulfonate), poly(2-acrylamido-2-methane sulfonic acid), polyacrylamide or mixtures thereof. In a preferred embodiment of the invention, the binder is gelatin or polyvinyl alcohol.

If a hydrophilic polymer is used in the image-receiving layer, it may be present in an amount of from about 0.02 to about 30 g/m$^2$, preferably from about 0.04 to about 16 g/m$^2$ of the image-receiving layer.

Latex polymer particles and/or inorganic oxide particles may also be used as the binder in the image-receiving layer to increase the porosity of the layer and improve the dry time. Preferably the latex polymer particles and /or inorganic oxide particles are cationic or neutral. Examples of inorganic oxide particles include barium sulfate, calcium carbonate, clay, silica or alumina, or mixtures thereof. In that case, the weight percent of particulates in the image receiving layer is from about 80 to about 95%, preferably from about 85 to about 90%.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2, 6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol, ketones or ketoalcohols such as acetone, methyl ethyl ketone and diacetone alcohol, ethers, such as tetrahydrofuran and dioxane, and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of microorganisms such as molds, fungi, etc. in aqueous inks. A preferred biocide for the ink composition employed in the present invention is Proxel® GXL (Zeneca Specialties Co.) at a final concentration of 0.0001–0.5 wt %.

A typical ink composition employed in the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers, anti-foaming agents; lubricants; preservatives; viscosity modifiers; dye-fixing agents; waterproofing agents; dispersing agents; UV-absorbing agents; mildew-proofing agents, mordants; antistatic agents, anti-oxidants, optical brighteners, and the like. A hardener may also be added to the ink-receiving layer if desired.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 $\mu$m.

The ink jet image-recording layer may be present in any amount which is effective for the intended purpose. In general, good results are obtained when it is present in an amount of from about 2 to about 44 g/m$^2$, preferably from about 6 to about 32 g/m$^2$, which corresponds to a dry thickness of about 2 to about 40 $\mu$m, preferably about 6 to about 30 $\mu$m for good balance of ink absorption, dry time and material usage.

The base material, the flexible substrate or pragmatic polymer sheet utilized in this invention on to which the light sensitive silver halide imaging layers are applied, must not interfere with the silver halide imaging layers. For many labels it is preferred that the substrate (pragmatic layer) be a white reflective material. Further, the base material of this invention needs to optimize the performance of the silver halide imaging system. Suitable flexible substrates must also perform efficiently in a automated packaging equipment for the application of labels to various containers. A preferred flexible substrate is cellulose paper. A cellulose paper substrate is flexible, strong and low in cost compared to polymer substrates. Further, a cellulose paper substrate allows for a textured label surface that can be desirable in some packaging applications. The paper may be provided with coatings that will provide waterproofing to the paper as the photographic element of the invention must be processed in aqueous chemistry to develop the silver halide image. An example of a suitable coating is acrylic or polyethylene polymer.

Polymer substrates are another preferred base material because they are tear resistant, have excellent conformability, good chemical resistance and high in strength. Preferred polymer substrates include polyester, oriented polyolefin such as polyethylene and polypropylene, cast polyolefins such as polypropylene and polyethylene, polystyrene, acetate and vinyl. Polymers are preferred as they are strong and flexible and provide an excellent surface for the coating of silver halide imaging layers.

Biaxially oriented polyolefin sheets are preferred as they are low in cost, have excellent optical properties that optimize the silver halide system and can be applied to packages in high speed labeling equipment. Microvoided composite biaxially oriented sheets are most preferred because the voided layer provides opacity and lightness without the need for $TiO_2$. Also, the voided layers of the microvoided biaxially oriented sheets have been shown to significantly reduce pressure sensitivity of the silver halide imaging layers. Microvoided biaxially oriented sheets are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; 4,632,869 and 5,866,282. The biaxially oriented polyolefin sheets also may be laminated to one or both sides of a paper sheet to form a label with greater stiffness if that is needed.

The flexible polymer pragmatic sheet base substrate may contain more than one layer. The skin layers of the flexible substrate can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Voided biaxially oriented polyolefin sheets are a preferred flexible base substrate for the coating of light sensitive silver halide imaging layers. Voided films are preferred as they provide opacity, whiteness and image sharpness to the image. "Void" is used herein to mean devoid of added solid and liquid matter, although it is likely the "voids" contain gas. The void-initiating particles which remain in the finished packaging sheet core should be from 0.1 to 10 μm in diameter and preferably round in shape to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The photographic element of this invention generally has a glossy surface, that is, a surface that is sufficiently smooth to provide excellent reflection properties. An opalescent surface may be preferred because it provides a unique photographic appearance to a label that is perceptually preferred by consumers. The opalescent surface is achieved when the microvoids in the vertical direction are between 1 and 3 μm. By the vertical direction, it is meant the direction that is perpendicular to the plane of the imaging member. The thickness of the microvoids preferably is between 0.7 and 1.5 μm for best physical performance and opalescent properties. The preferred number of microvoids in the vertical direction is between 8 and 30. Less than 6 microvoids in the vertical direction do not create the desired opalescent surface. Greater than 35 microvoids in the vertical direction do not significantly improve the optical appearance of the opalescent surface.

The void-initiating material for the flexible base substrate may be selected from a variety of materials and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=$CH_2$, wherein Ar represents an aromatic hydrocarbon radical, or an aromatic halohydrocarbon radical of the benzene series and R is hydrogen or the methyl radical; acrylate-type monomers include monomers of the formula $CH_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2$=CH(O)COR, wherein R is an alkyl radical containing from 2 to 18 carbon atoms, acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_n OH$ wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof Examples of typical monomers for making the cross-linked polymer void initiating particles include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene, and the cross-linking agent is divinylbenzene.

Processes well known in the art yield nonuniformly sized void initiating particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, or calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

The total thickness of the topmost skin layer of the polymeric base substrate may be between 0.20 $\mu$m and 1.5 $\mu$m, preferably between 0.5 and 1.0 $\mu$m. Below 0.5 $\mu$m any inherent nonplanarity in the coextruded skin layer may result in unacceptable color variation. At skin thickness greater than 1.0 $\mu$m, there is a reduction in the photographic optical properties such as image resolution. At thickness greater than 1.0 $\mu$m, there is also a greater material volume to filter for contamination such as clumps or poor color pigment dispersion.

Addenda may be added to the top most skin layer of the flexible base substrate to change the color of the imaging element. For labeling use, a white substrate with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, and Irgalite organic blue pigments. Optical brightener may also be added to the skin layer to absorb UV energy and emit light largely in the blue region. $TiO_2$ may also be added to the skin layer. While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 $\mu$m does not substantially improve the optical properties of the support, will add cost to the design, and will cause objectionable pigments lines in the extrusion process.

Addenda may be added to the core matrix and/or to one or more skin layers to improve the optical properties of the flexible substrate. Titanium dioxide is preferred and is used in this invention to improve image sharpness or MTF, opacity, and whiteness. The $TiO_2$ used may be either anatase or rutile type. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$. Other pigments known in the art to improve photographic optical responses may also be used in this invention. Examples of other pigments known in the art to improve whiteness are talc, kaolin, $CaCO_3$, $BaSO_4$, ZnO, $TiO_2$, ZnS, and $MgCO_3$. The preferred $TiO_2$ type is anatase, as anatase $TiO_2$ has been found to optimize image whiteness and sharpness with a voided layer.

The voids provide added opacity to the flexible substrate. This voided layer can also be used in conjunction with a layer that contains at least one pigment from the group consisting of $TiO_2$, $CaCO_3$, clay, $BaSO_4$, ZnS, $MgCO_3$, talc, kaolin, or other materials that provide a highly reflective white layer in said film of more than one layer. The combination of a pigmented layer with a voided layer provides advantages in the optical performance of the final image.

The flexible biaxially base substrate of this invention which has a microvoided core is preferred. The microvoided core adds opacity and whiteness to the imaging support, further improving imaging quality. Combining the image quality advantages of a microvoided core with a material, which absorbs ultraviolet energy and emits light in the visible spectrum, allows for the unique optimization of image quality, as the image support can have a tint when exposed to ultraviolet energy yet retain excellent whiteness when the image is viewed using lighting that does not contain significant amounts of ultraviolet energy such as indoor lighting.

It has been found that the microvoids located in the voided layer of the flexible biaxially oriented substrate provide a reduction in undesirable pressure fog. Mechanical pressure, of the order of hundreds of kilograms per square centimeter, causes an undesirable, reversible decrease in sensitivity by a mechanism at the time of writing that is not fully understood. The net result of mechanical pressure is an unwanted increase in density, mainly yellow density. The voided layer in the biaxially oriented flexible substrate absorbs mechanical pressure by compression of the voided layer, common in the converting and photographic processing steps, and reduces the amount of yellow density change. Pressure sensitivity is measured by applying a 206 MPa load to the coated light sensitive silver halide emulsion, developing the yellow layer, and measuring the density difference with an X-Rite model 310 (or comparable) photographic transmission densitometer between the control sample which was unloaded and the loaded sample. The preferred change in yellow layer density is less than 0.02 at a pressure of 206 MPa. A 0.04 change in yellow density is perceptually significant and, thus, undesirable.

The coextrusion, quenching, orienting, and heat setting of the flexible base substrate may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers, while restraining to some degree the sheet against retraction in both directions of stretching.

By having at least one nonvoided skin on the microvoided core, the tensile strength of the flexible base substrate is increased and makes the sheet more manufacturable. The higher tensile strength also allows the sheets to be made at wider widths and higher draw ratios than when sheets are made with all layers voided. Coextruding the layers further simplifies the manufacturing process.

A flexible label pragmatic polymer base that is transparent may be preferred. A transparent flexible label base is used to provide a clear pressure sensitive label particularly useful for labeling applications that allow the contents of the package to be viewed though the label. Examples include wine bottle labeling, shampoo bottle labeling and beverage bottles that utilize clear or colored glass. For this invention, "transparent" material is defined as a material that has a spectral transmission greater than 90%. For a imaging element, spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer.

A flexible label base that has an optical transmission less than 20% is preferred for most applications. Optical transmission less than 20% provide a superior opaque silver halide pressure sensitive label that is highly reflective. Opaque, highly reflective labels are useful for pressure sensitive labeling against a background that is dark and would interfere with the quality of the image. An example would be the labeling of a black package, a label base with optical transmission greater than 20% would darken the image, resulting is a loss of low density detail such as facial detail content.

A pressure sensitive photographic label adhesive is utilized in the invention to allow the developed silver halide packaging label to be adhered to the surface of the package typically utilizing high speed packaging equipment. "Peelable separation" or "peel strength" or "separation force" is a measure of the amount of force required to separate the silver halide label from the package to which the label has been applied. The peel strength is the amount of force required to separate two surfaces that are held together by internal forces of the photographic label adhesive which consist of valence forces or interlocking action, or both. Peel strength is measured using an Instron gauge and peeling the sample at 180 degrees with a crosshead speed of 1.0 meters/min. The sample width is 5 cm and the distance peeled is 10 cm in length.

A peelable photographic label adhesive is utilized to allow the consumer to separate the label from the package. Separation of the label from the package would allow for example, rebate coupons to be attached to the package or used to for consumer promotions. For a peelable photographic label adhesive, the preferred peel strength between the silver halide pressure sensitive label and the package is no greater than 80 grams/cm. A peel strength greater than 100 grams/cm, consumers would begin to have difficulty separating the image from the package. Further, at peel strengths greater than 110 grams/cm, the force is beginning to approach the internal strength of paper substrate, causing an unwanted fracture of the paper substrate before the separation of the image.

Upon separation of the image from the substrate, the peelable photographic label adhesive of this invention has a preferred repositioning peel strength between 20 grams/cm and 100 grams/cm. Repositioning peel strength is the amount of force required to peel the separated image containing an photographic label adhesive from a stainless steel block at 23° C. and 50% RH. At repositioning peel strengths less than 15 grams/cm, the photographic label adhesive lacks sufficient peel strength to remain adhered to a variety of surfaces such as refrigerators or photo albums. At peel strengths greater than 120 grams/cm, the photographic label adhesive of this invention is too aggressive, not allowing the consumer to later reposition the image.

The peelable photographic label adhesive of this invention may be a single layer or two or more layers. For two or more photographic label adhesive layers, one of the photographic label adhesive layers preferentially adheres to the label base. As the image is separated from the substrate, this allows the photographic label adhesive of this invention be adhered to the label base for repositioning.

A substrate that comprises a release layer for a photographic label adhesive that repositions is preferred. The release layer allows for uniform separation of the photographic label adhesive at the photographic label adhesive base interface. The release lay er may be applied to the liner by any method known in the art for applying a release layer to substrates. Examples include silicone coatings, tetrafluoroethylene fluorocarbon coatings, fluorinated ethylenepropylene coatings, and calcium stearate.

Suitable peelable photographic label adhesives of this invention must not interact with the light sensitive silver halide imaging system so that image quality is deteriorated. Further, since photographic elements of this invention must be photoprocessed, the performance of the photographic label adhesive of this invention must not be deteriorated by photographic processing chemicals. Suitable photographic label adhesive may be inorganic or organic, natural or synthetic, that is capable of bonding the image to the desired surface by surface attachment. Examples of inorganic photographic label adhesives are soluble silicates, ceramic and thermosetting powdered glass. Organic photographic label adhesives may be natural or synthetic. Examples of natural organic photographic label adhesives include bone glue, soybean starch cellulosics, rubber latex, gums, terpene, mucilages and hydrocarbon resins. Examples of synthetic organic photographic label adhesives include elastomer solvents, polysulfide sealants, thermoplastic resins such as isobutylene and polyvinyl acetate, thermosetting resins such as epoxy, phenoformaldehyde, polyvinyl butyral and cyanoacrylates and silicone polymers.

For single or multiple layer photographic label adhesive systems, the preferred photographic label adhesive composition is selected from the group consisting of natural rubber, synthetic rubber, acrylics, acrylic copolymers, vinyl polymers, vinyl acetate-, urethane, acrylate-type materials, copolymer mixtures of vinyl chloride-vinyl acetate, polyvinylidene, vinyl acetate-acrylic acid copolymers, styrene butadiene, carboxylated stryrene butadiene copolymers, ethylene copolymers, polyvinyl alcohol, polyesters and copolymers, cellulosic and modified cellulosic, starch and modified starch compounds, epoxies, polyisocyanate, polyimides.

Water based pressure sensitive adhesion provide some advantages for the manufacturing process of non solvent emissions. Repositionable peelable photographic label adhesive containing non-photographic label adhesive solid particles randomly distributed in the photographic label adhesive layer aids in the ability to stick and then remove the print to get the desired end result. The most preferred pressure sensitive peelable photographic label adhesive is a respositionable photographic label adhesive layer containing at about 5% to 20% by weight of a permanent photographic label adhesive such as isooctyl acrylate/acrylic acid copolymer and at about 95% to 80% by weight of a tacky elastomeric material such as acrylate microspheres with the photographic label adhesive layer coverage at about 5 to 20 g/m$^2$.

The preferred peelable photographic label adhesive materials may be applied using a variety of methods known in the art to produce thin, consistent photographic label adhesive coatings. Examples include gravure coating, rod coating, reverse roll coating, and hopper coating. The photographic label adhesives may be coated on the liner or the base materials prior to lamination.

For single or multiple layer photographic label adhesive systems, the preferred permanent photographic label adhesive composition is selected from the group consisting of epoxy, phenoformaldehyde, polyvinyl butyral, cyanoacrylates, rubber based photographic label adhesives, styrene/butadiene based photographic label adhesives, acrylics and vinyl derivatives. Peelable photographic label adhesives and permanent photographic label adhesives may be used in combination in the same layer or in different locations in the photographic support structure. An example of a combination photographic label adhesive structure is a peelable photographic label adhesive between the top biaxially oriented sheet and the base materials and a permanent photographic label adhesive between the bottom biaxially oriented sheet and the base material.

The silver halide imaging layers on a pressure sensitive substrate preferably are applied to a variety of packages in automated labeling equipment. Preferred package types are bottles, can, stand up pouch, box and a bag. The packages may contain materials that require a package for sale. Preferred materials that are packaged include liquids and particulate.

The silver halide packaging label of the invention preferably has a thickness of less than 600 $\mu$m. A silver halide packaging label greater than 650 $\mu$m offers no significant improvement in either imaging quality or packaging label performance. Further, transport through high speed packaging equipment is difficult at a photographic label thickness greater than 650 $\mu$m and stripping the photographic labels utilizing the Bernoulli method is difficult if the thickness of the photographic label exceeds 700 $\mu$m.

The initial score cut of the pragmatic sheet and the adhesive layer is preferably accomplished by multiple double edged circular razor discs, 6.35 cm diameter, 0.30 mm thick, with 20–30 degree included angles were used in pairs on a common arbor with a spacing between them of 1.52 mm to 3.10 mm. Several of these pairs were then rigidly mounted onto a common driven arbor, and mounted on an arbor situated directly above a second arbor, which was carefully aligned to the first. Mounted on this second driven arbor was a precision ground, medium density polymer sleeve, 12.7 cm diameter, which served as a backup to the razor discs. Teflon polymer sleeves are preferred as Teflon provides a low coefficient of friction material with excellent run out and compression to accomplish a high quality cut. It has been shown that with both the discs and the sleeve, radial runout needs to be tightly controlled to within 0.003 mm for a high quality cut.

To score the web material, the web material was fed with the pragmatic sheet up through the machine, and over the top of the lower arbor with sleeve. The top arbor with the razor discs was lowered downward until scratches were noticed on the surface of the material. At this point the discs are just making contact with the material. It was then necessary to lower the discs further, enough to penetrate the face layers and adhesive layer. Care was taken not to penetrate too far into the carrier sheet, which will cause the web material to be completely cut through. As the web material was unwound and fed through the machine, the razor discs cut several distinct zones on the surface of the material. The machine was stopped, and with careful manipulation, the narrow strips were gripped and pulled upwards 45–90 degrees to the material surface. These strips were fed to other rewind spindles for windup, at 1–2 pli tension.

The scoring and stripping process removed narrow strips of pragmatic sheet and adhesive. The web material is designed in such a way that the adhesive remains attached to the pragmatic sheet as it is removed and spooled up. The zones where the strips were attached were clear of any pragmatic sheet or adhesive.

Another preferred slitting technique not shown would be to incorporate a separate scoring and stripping station directly behind the slitter knives. As the web material was scored and stripped, it would pass directly into the slitter knives, which would be precisely aligned to cut the material down the center of the stripped zone. This process would likely be more efficient as problems with web alignment are reduced.

Another slitting technique not shown for producing tack free edges is the use of a cutting die. Utilization of a cutting die to cut the pragmatic sheet and adhesive allows for a high precision cut of the pragmatic sheet and adhesive without the need for knives. The cutting die may be a rotary die or a magnetic die attached to rotary cylinder by way of magnets.

Another preferred method of providing a tack free edge is by the use of laser slitting of the pragmatic sheet. Laser scoring is accomplished by focusing a high power laser beam on to the surface of the pragmatic sheet to be scored. In this case, the web materials of the invention is preferably translated under a stationary focused laser beam. The depth of the laser score into the pragmatic sheet of the invention is critical to the performance of the scoring operation. Insufficient depth of laser score results in incomplete slitting and thus separation of the pragmatic sheet from the carrier sheet. A laser score than penetrates too far into the- carrier sheet results in a loss of bending resistance as the carrier sheet is partially fractured. Depth of laser score is a function of the laser power density per unit area and the translation velocity of the focused spot in relation to the material. The translation of the material or translation of the focused spot can be described as laser energy density per unit area. Laser scoring can be accomplished with either a repetitively pulsed laser or a continuous wave (CW) laser. The pulse rate of the laser should be approximately 1 pulse per second to continuous. The laser optical power should be sufficient to ablate or vaporize the material to be scored when focused with a positive lens. The focal length of the lens preferably is in the range of 3 mm to 500 mm.

The wavelength of the laser should be of a wavelength that is absorptive to the pragmatic sheet being scored. The preferred wave length for the scoring of the pragmatic sheet of the invention is between 100 nm to 20,000 nm wavelength. The material should be translated at velocity in which sufficient laser energy to cause ablation is not exceeded. The translated velocity of the web material of the invention preferably is between 1.0 meters/min to 600 meters/min.

The following is an example of a preferred opaque, reflective silver halide pressure sensitive label structure that has an environmental protection layer (EPL) applied to the outermost silver halide imaging layer. A bright red tint has been incorporated into the polyethylene layer to provide a bright red background for the silver halide formed image.

| |
|---|
| 7.5 μm ground styrene butyl acrylate fused EPL |
| Layer of silver halide formed image |
| Polyethylene with a density of 0.925 g/cc with bright red tint |
| Polypropylene with 18% TiO$_2$ |
| Polypropylene voided layer with a density of 0.50 g/cc |
| Polypropylene |
| Acrylic pressure sensitive adhesive |
| Cellulose paper peelable back |

The following is another example of a preferred clear silver halide pressure sensitive label structure that has an environmental protection layer (EPL) applied to the outermost developed silver halide imaging layer. Dye based printing inks were applied to the silver halide formed image after image development, before application of the EPL.

| |
|---|
| Oriented polypropylene EPL |
| Acrylic pressure sensitive adhesive |
| Dye based printed ink |
| Layer of silver halide formed image |
| Polyethylene with a density of 0.925 g/cc and blue tint |
| Polypropylene with optical brightener |
| Polypropylene |
| Acrylic pressure sensitive adhesive |
| Polyester peelable back |

A photographic label comprising a pragmatic polymer sheet, at least one layer comprising at least one image forming layer comprising photosensitive silver halide grains and dye forming coupler above said pragmatic polymer sheet, and a lower strippable paper carrier, a pressure sensitive adhesive layer between said lower strippable carrier and said pragmatic polymer sheet, wherein said carrier has exposed edges where it has a greater surface area than the pragmatic sheet and said image further comprises fiducial marks and said at least one layer comprising said photosensitive silver halide grains has an exposure time to obtain a usable Dmax of 1.5 of less than 0.01 seconds is preferred. The digital working silver halide imaging system provides a means to print directly from a digital image file. Digital silver halide printing of the label also provides a means of changing the content of the label without the need for a press change over. The fiducial marks printed on the label allow for registration of the label during die cutting of the pragmatic sheet and stripping of the pragmatic sheet.

The preferred photographic element of this invention is directed to a silver halide photographic element capable of excellent performance when exposed by an electronic printing method. An electronic printing method comprises subjecting a radiation sensitive silver halide emulsion layer of a recording element to actinic radiation of at least $10^{-4}$ ergs/cm$^2$ for up to 100 μseconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. This invention in a preferred embodiment utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \quad (I)$$

wherein n is zero, −1, −2, −3, or −4; M is a filled frontier orbital polyvalent metal ion, other than iridium; and L$_6$ represents bridging ligands which can be independently selected, provided that at least four of the ligands are anionic ligands, and at least one of the ligands is a cyano ligand or a ligand more electronegative than a cyano ligand, and (ii) an iridium coordination complex containing a thiazole or substituted thiazole ligand. Preferred photographic imaging layer structures are described in EP Publication 1 048 977. The photosensitive imaging layers described therein provide particularly desirable images on the pragmatic sheet of this invention.

The digital silver halide imaging system disclosed above allows for label images that contain text, graphics and image content to be printed utilizing digital files. A method of label distribution comprising forming a label file, managing said label file to calibrate said label file with at least one silver halide output device, distributing said label file to at least two devices in separate geographic locations, printing labels, wherein said labels comprise a pragmatic polymer sheet, at least one layer comprising an image comprising dyes formed from couplers above said pragmatic polymer sheet, and a lower strippable paper carrier, a pressure sensitive adhesive layer between said lower strippable carrier and said pragmatic polymer sheet, and an environmental protection layer overlaying at least one photosensitive layer wherein said carrier has exposed edges where it has a greater surface area than the pragmatic sheet and said image further comprises fiducial marks is preferred for printing of silver halide labels. Distributive printing, or a method of printing were image files are printed at several remote locations, allows for label files to be quickly printed and distributed to product labeling lines. This significant reduction in printing cycle time significantly reduces the cost of silver halide label in that the travel time from the printer to the label line is significantly reduced. Further, the label content can be easily changed as inventory is reduced between label manufacturing and the labeling line.

An example of distributive printing is as follows; label creation performed on a digital work station in one central location after approval is sent to remote printers via the internet. Silver halide labels are printed in several geographic locations and upon completion of the printing, processing, protecting the image, die cutting and stripping of the matrix, the silver halide printed labels are sent to product labeling lines. Further, several different digital label files can be sent to the remote printers. The files might contain language differences, geographic image preference and country specific labeling requirements for text.

In another embodiment of the invention, the printing of labels is determined by the consumption of the consumer good being labeled. For example, laser scanning of silver halide shampoo bottle containing a bar code in the store could detect the number of labels being utilized and by means of an internet connection, feedback to the label printer as to the amount of labels required for the next run of the shampoo labels. Further, by laser scanning the labels, a software program could determine the consumer preference for a label type or image used on the label and that critical information can be feed back through the internet to the remote label printing device to update the label file for a specific consumer preference thereby providing labeling changes based on consumer purchasing patterns.

EXAMPLES

Example 1

In this example a high quality silver halide pressure sensitive packaging label was created by applying a light sensitive silver halide imaging layers to a pressure sensitive label stock. The label stock consisted of a flexible white biaxially oriented polypropylene face stock backside coated with a pressure sensitive adhesive that was adhesive laminated to a laminated coated paper liner. The light sensitive silver halide imaging layers were a yellow, magenta, and cyan coupler system capable of accurate reproduction of flesh tone. After processing the image, the photographic label of the invention was overprinted with ink to expand the color gamut of the silver halide formed image. The photographic label was further coated with an environmental protection layer to protect the delicate silver halide imaging layers from environmental solvents. This example will demonstrate many of the advantages of a photographic label and the expansion of the silver halide color gamut by addition of printing inks Biaxially Oriented Polyolefin Face Stock A composite sheet polyolefin sheet (70 $\mu$m thick) (d=0.68 g/cc) consisting of a microvoided and oriented polypropylene core (approximately 60% of the total sheet thickness), with a homopolymer non-microvoided oriented polypropylene layer on each side of the voided layer; the void initiating material used was poly(butylene terephthalate). The polyolefin sheet had a skin layer consisting of polyethylene and a blue pigment. The polypropylene layer adjacent the voided layer contained 8% rutile $TiO_2$. The silver halide imaging layers were applied to the blue tinted polyethylene skin layer.

Pressure Sensitive Adhesive

Permanent solvent based acrylic adhesive 12 $\mu$m thick

Laminated Paper Liner

A laminated paper liner that consisted of a cellulose paper core (80 micrometers thick) on to which a biaxially oriented sheet of polypropylene was extrusion laminated to the backside utilizing LDPE resin. The backside oriented polypropylene contained a roughness layer to allow for efficient transport in photographic printing equipment. The roughness layer consisted of a mixture of polyethylene and polypropylene immiscible polymers. The topside of the liner was extrusion coated with LDPE for a silicone hold out. The cellulose paper contained 8% moisture and 1% salt for conductivity. The total thickness of the laminated paper liner was 128 micrometers, and the stiffness was 80 millinewtons in both the machine and cross directions. The paper liner was coated with a silicone release coat adjacent to the extruded LDPE layer.

Structure of the base for the photographic packaging label material of the example is as follows:

Voided polypropylene sheet (face stock)
Acrylic pressure sensitive adhesive
Silicone coating
Laminated paper liner Silver chloride emulsions were chemically and spectrally sensitized as described below. A biocide comprising a mixture of N-methyl-isothiazolone and N-methyl-5-chloro-isthiazolone was added after sensitization.

Blue Sensitive Emulsion (Blue EM-1). A high chloride silver halide emulsion is precipitated by adding approximately equimolar silver nitrate and sodium chloride solutions into a well-stirred reactor containing glutaryldiaminophenyldisulfide, gelatin peptizer, and thioether ripener. Cesium pentachloronitrosylosmate(II) dopant is added during the silver halide grain formation for most of the precipitation, followed by the addition of potassium hexacyanoruthenate(II), potassium (5-methyl-thiazole)-pentachloroiridate, a small amount of KI solution, and shelling without any dopant. The resultant emulsion contains cubic-shaped grains having edge length of 0.6 $\mu$m. The emulsion is optimally sensitized by the addition of a colloidal suspension of aurous sulfide and heat ramped to 60° C., during which time blue sensitizing dye BSD-4, potassium hexchloroiridate, Lippmann bromide, and 1-(3-acetamidophenyl)-5-mercaptotetrazole were added.

Green Sensitive Emulsion (Green EM-1): A high chloride silver halide emulsion is precipitated by adding approximately equimolar silver nitrate and sodium chloride solutions into a well-stirred reactor containing gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic-shaped grains of 0.3 $\mu$m in edge length size. The emulsion is optimally sensitized by the addition of glutaryldiaminophenyldisulfide, a colloidal suspension of aurous sulfide and heat ramped to 55° C., during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1): A high chloride silver halide emulsion is precipitated by adding approximately equimolar silver nitrate and sodium chloride solutions into a well-stirred reactor containing gelatin peptizer and thioether ripener. During the silver halide grain formation, potassium hexacyanoruthenate(II) and potassium (5-methylthiazole)-pentachloroiridate are added. The resultant emulsion contains cubic shaped grains of 0.4 $\mu$m in edge length size. The emulsion is optimally sensitized by the addition of glutaryldiaminophenyldisulfide, sodium thiosulfate, tripotassium bis{2-[3-(2-sulfobenzamido)phenyl]-mercaptotetrazole} gold(I) and heat ramped to 64° C., during which time 1-(3-acetamidophenyl)-5-mercaptotetrazole, potassium hexachloroiridate, and potassium bromide are added. The emulsion is then cooled to 40° C., pH adjusted to 6.0, and red sensitizing dye RSD-1 is added.

Coupler dispersions were emulsified by methods well known to the art, and the following layers were coated on the following support:

The following flesh tone optimized light sensitive silver halide imaging layers were utilized to prepare photographic label utilizing the invention label base material. The following imaging layers were coated utilizing curtain coating:

| Layer | Item | Laydown (g/m²) |
|---|---|---|
| Layer 1 | Blue Sensitive Layer | |
| | Gelatin | 1.3127 |
| | Blue sensitive silver (Blue EM-1) | 0.2399 |
| | Y-4 | 0.4143 |
| | ST-23 | 0.4842 |
| | Tributyl Citrate | 0.2179 |
| | ST-24 | 0.1211 |
| | ST-16 | 0.0095 |
| | Sodium Phenylmercaptotetrazole | 0.0001 |
| | Piperidino hexose reductone | 0.0024 |
| | 5-chloro-2-methyl-4-isothiazolin-3-one/2-methyl-4-isothiazolin-3-one(3/1) | 0.0002 |
| | SF-1 | 0.0366 |
| | Potassium chloride | 0.0204 |
| | Dye-1 | 0.0148 |
| Layer 2 | Interlayer | |
| | Gelatin | 0.7532 |
| | ST-4 | 0.1076 |
| | S-3 | 0.1969 |
| | 5-chloro-2-methyl-4-isothiazolin-3-one/2-methyl-4-isothiazolin-3-one(3/1) | 0.0001 |
| | Catechol disulfonate | 0.0323 |
| | SF-1 | 0.0081 |
| Layer 3 | Green Sensitive Layer | |
| | Gelatin | 1.1944 |
| | Green Sensitive Silver (Green EM-1) | 0.1011 |
| | M-4 | 0.2077 |
| | Oleyl Alcohol | 0.2174 |
| | S-3 | 0.1119 |
| | ST-21 | 0.0398 |
| | ST-22 | 0.2841 |
| | Dye-2 | 0.0073 |
| | 5-chloro-2-methyl-4-isothiazolin-3-one/2-methyl-4-isothiazolin-3-one(3/1) | 0.0001 |
| | SF-1 | 0.0236 |
| | Potassium chloride | 0.0204 |
| | Sodium Phenylmercaptotetrazole | 0.0007 |
| Layer 4 | M/C Interlayer | |
| | Gelatin | 0.7532 |
| | ST-4 | 0.1076 |
| | S-3 | 0.1969 |
| | Acrylamide/t-Butylacrylamide sulfonate copolymer | 0.0541 |
| | Bis-vinylsulfonylmethane | 0.1390 |
| | 3,5-Dinitrobenzoic acid | 0.0001 |
| | Citric acid | 0.0007 |
| | Catechol disulfonate | 0.0323 |
| | 5-chloro-2-methyl-4-isothiazolin-3-one/2-methyl-4-isothiazolin-3-one(3/1) | 0.0001 |
| Layer 5 | Red Sensitive Layer | |
| | Gelatin | 1.3558 |
| | Red Sensitive silver (Red EM-1) | 0.1883 |
| | IC-35 | 0.2324 |
| | IC-36 | 0.0258 |
| | UV-2 | 0.3551 |
| | Dibutyl sebacate | 0.4358 |
| | S-6 | 0.1453 |
| | Dye-3 | 0.0229 |
| | Potassium p-toluenethiosulfonate | 0.0026 |
| | 5-chloro-2-methyl-4-isothiazolin-3-one/2-methyl-4-isothiazolin-3-one(3/1) | 0.0001 |
| | Sodium Phenylmercaptotetrazole | 0.0005 |
| | SF-1 | 0.0524 |

-continued

| Layer | Item | Laydown (g/m²) |
|---|---|---|
| Layer 6 | UV Overcoat | |
| | Gelatin | 0.8231 |
| | UV-1 | 0.0355 |
| | UV-2 | 0.2034 |
| | ST-4 | 0.0655 |
| | SF-1 | 0.0125 |
| | S-6 | 0.0797 |
| | 5-chloro-2-methyl-4-isothiazolin-3-one/2-methyl-4-isothiazolin-3-one(3/1) | 0.0001 |
| Layer 7 | SOC | |
| | Gelatin | 0.6456 |
| | Ludox AM ™ (colloidal silica) | 0.1614 |
| | Polydimethylsiloxane (DC200 ™) | 0.0202 |
| | 5-chloro-2-methyl-4-isothiazolin-3-one/2-methyl-4-isothiazolin-3-one(3/1) | 0.0001 |
| | SF-2 | 0.0032 |
| | Tergitol 15-S-5 ™ (surfactant) | 0.0020 |
| | SF-1 | 0.0081 |
| | Aerosol OT ™ (surfactant) | 0.0029 |

The silver halide label media was exposed using a digital-exposing laser-marking engine. The laser marking engine exposed the image with at very short exposure times (1000 nsec to 20 nsec) with monochromatic light sources of red, green and blue light to form the latent image. An area of the image that was to be spot colored was not exposed. The images were exposed in such a manner as to be placed for the repeat of the diameter of the flexographic plate. A fiducial was imaged at the start of each repeat pattern. A 500 meter roll of media was imaged using the laser marking engine. The latent imaged is subsequently developed using photochemical processing (RA-4 processing chemical) and photo-processing equipment (Kodak Professional Color Print Process Model 22LL). Part of the developed image that was not exposed was the Dmin area in the image. The fiducial mark is a black registration mark with a Status A density of 1.9. The fiducial has a square design with a length of 0.25 inches and a width of 0.25 inches.

The digital image was also rendered onto a stock flexographic material with the halftone area of the flexographic plate being the image area for the spot color. Additionally, a flexographic die was cut to outline the specified label size, a 3-inch by 3-inch label. The imaged silver halide media was mounted onto a flexographic press equipped with an optical detection unit and a re-registration unit (servo-drive). As the photographic material is transported through the system, the optical detection unit sensed the fiducial mark on the photographic media and using the servo drive adjusted the registration of the flexographic plate in order to be able to apply ink to the Dmin area of the silver halide media. The ink was applied to the media using flexographic plate, which has been placed in register with the image (+/−0.3 mm registration tolerance for image to image and repeat to repeat).

The environmental protection layers was applied on the flexographic press. The environmental protection layer was prepared using 7.5 μm ground polymer particles (styrene butyl acrylate available from Hercules as Piccotoner 1221), a soft latex binder (copolymer of butyl acrylate, 2-acrylamido-2-methylpropanesulfonate, and acetoacetoxyethylmethacrylate) as a 20% suspension, a hydrophilic thickening agent (Keltrol T) as a 1% solution, and a surfactant (Olin 10G) as a 10% solution.

In a subsequent converting operation, the media was die cut and the matrix removed inline with the converting equipment. As the photographic media was transported through the system, the optical detection unit senses the fiducial mark on the photographic media and using the servo drive adjusts the registration of the flexographic die in order to be able to cut the label area of the media. The media is cut using flexographic die, which has been placed in register with the image (+/−0.3 mm registration tolerance for repeat to repeat). The matrix is removed and a roll of photographic and ink printed labels was generated.

The above silver halide packing label material was hand applied to several polymer bottles typically utilized in the health and beauty industry to simulate application of the label to a package.

The photographic packaging label of the invention showed many significant improvements compared to prior art flexography or gravure printed labels. The invention provides a printing method that is economically viable when printing short runs, as the cost of printing plates or printing cylinders are avoided. Because a digital silver halide imaging system was used to print the labels, each label can be different without the need for expensive printing press setup costs. The use of silver halide images applied to a package ensures the highest image quality currently available compared to the common, but lower quality six-color rotogravure printed images. Applying the environmental protection layer to the silver halide imaging layers significantly improves the silver halide image toughness and allows the silver halide image to be used in demanding labeling applications such as shampoo bottles or wine bottles, as both of these labels are subjected to high humidity that would destroy traditional photographs. Further, because the yellow, magenta, and cyan layers contain gelatin interlayers, the silver halide images appear to have depth of image compared to prior art ink jet, electrophotographic, or gravure printed images which appear flat and lifeless. The silver halide image layers of the invention have also been optimized to accurately replicate flesh tones, providing superior images of people compared to alternate digital imaging technologies. Because the silver halide imaging layers were coated and developed on a thin, flexible pressure sensitive packaging label, they can be applied to a variety packages utilizing well-known, high speed packaging equipment.

This unique and novel approach of coupling an optical re-registration (servo-drive) device with flexographic halftone printing (custom ink(s) or uv curable ink(s), or CYMK) and with digital silver halide images enables expansion of color gamut for photographic media or photographic labels. The resulting image overcomes the inherent limitation of photographic dye sets used in photographic papers. For example, the yellow color used in Kodak packaging of its products is not rendered in using the photographic dye set. This technique enables the packager to fulfill a customer requirement.

In Table 1, the silver halide ink printed media (invention) was compared to a typical ink printed label web material (Fasson Primax 350) within 1 week after printing. In Table 2, the silver halide ink printed media (invention) was compared to a typical ink printed label web material (Fasson Primax 350) after 39 days. The following test metrics were utilized in Tables 1 and 2;

Solid Ink Densities is defined as "the degree of darkness of a particular ink".

Dot Gain is defined as "the change in size of a printing dot from film to press sheet or substrate".

Hue Error is defined as "how far a color is off from an ideal process ink. 0% hue error would be perfect. It is normal for magenta to be in the 50% range".

Grayness is defined as "how clean an ink is, with a perfect ink having 0% grayness".

Print Contrast is defined as "indication of how well the ¾ tone is printing, and is an excellent indicator of plugging, flatness and low contrast".

Trap is defined as "how well one ink prints over another".

Visual Gray Balance is defined as "the values for yellow, magenta, and cyan that are needed to produce a neutral gray when printed at a normal density".

Slur is defined as "a condition caused by slippage at the moment of impression between substrate and plate".

A comparison of flexographic halftone inks applied to photographic media versus flexographic halftone inks applied to a stock flexographic label media (Fasson Primax 350) did not exhibit visual nor quantitative differences. Samples of flexographic halftone inks applied to photographic media and flexographic halftone inks applied to a stock flexographic label media (Fasson Primax 350) were tested in a "fresh" state (within a week of the coating) and "mature" state (after dwelling in ambient office conditions for 39 days) using Dixiegraphics fingerprint analysis for image quality. There were no significant differences between the samples with respect to solid ink densities, dot gain, hue error, grayness, print contrast, trap, visual gray balance or slur. Additional visual examination of the samples did not detect significant differences in image quality between the samples.

TABLE 1

|  | Photographic Media | | | | Fasson Primax 350 | | | |
| --- | --- | --- | --- | --- | --- | --- | --- | --- |
|  | Yellow | Magenta | Cyan | Black | Yellow | Cyan | Magenta | Black |
| Solid ink densities | 1.03 | 1.64 | 1.19 | 1.3 | .94 | 1.42 | 1.1 | 1.25 |
| Dot gain | Y | M | C | K | Y | C | M | K |
| 2% | 12 | 10 | 10 | 10 | 12 | 12 | 7 | 15 |
| 3% | 20 | 15 | 16 | 22 | 20 | 17 | 14 | 23 |
| 5% | 31 | 23 | 26 | 30 | 30 | 29 | 22 | 32 |
| 25% | 66 | 65 | 61 | 63 | 63 | 65 | 53 | 68 |
| 50% | 88 | 87 | 86 | 83 | 89 | 88 | 79 | 93 |
| 75% | 95 | 96 | 95 | 93 | 95 | 95 | 92 | 97 |
| 90% | 98 | 98 | 98 | 98 | 98 | 97 | 96 | 100 |
| Hue Error | 6 | 45 | 19 | — | 7 | 48 | 22 | — |
| Grayness | 10 | 16 | 20 | — | 5 | 14 | 18 | — |
| Print Contrast | 10 | 21 | 17 | 22 | 12 | 23 | 22 | 13 |
| Trap | 86 | 62 | 100 | — | 92 | 92 | 101 | — |
| Visual Gray Balance | O.K. | O.K. | O.K. | — | O.K. | O.K. | O.K. | — |
| Slur | Slight | Slight | Slight | — | Slight | Slight | Slight | — |

TABLE 2

|  | Photographic Media | | | | Fasson Primax 350 | | | |
| --- | --- | --- | --- | --- | --- | --- | --- | --- |
|  | Yellow | Magenta | Cyan | Black | Yellow | Cyan | Magenta | Black |
| Solid ink densities | 1.03 | 1.64 | 1.2 | 1.3 | .95 | 1.42 | 1.06 | 1.25 |
| Dot gain | Y | M | C | K | Y | C | M | K |
| 2% | 10 | 7 | 113 | 8 | 12 | 7 | 12 | 11 |
| 3% | 22 | 13 | 13 | 23 | 21 | 14 | 17 | 22 |
| 5% | 33 | 24 | 20 | 31 | 31 | 28 | 28 | 31 |
| 25% | 69 | 66 | 64 | 67 | 66 | 67 | 66 | 66 |
| 50% | 90 | 86 | 87 | 89 | 88 | 88 | 83 | 89 |

TABLE 2-continued

|  | Photographic Media | | | | Fasson Primax 350 | | | |
| --- | --- | --- | --- | --- | --- | --- | --- | --- |
|  | Yellow | Magenta | Cyan | Black | Yellow | Cyan | Magenta | Black |
| 75% | 96 | 95 | 95 | 93 | 96 | 95 | 93 | 94 |
| 90% | 99 | 98 | 98 | 98 | 98 | 96 | 96 | 97 |
| Hue Error | 6 | 45 | 20 | — | 7 | 49 | 21 | — |
| Grayness | 10 | 16 | 20 | — | 6 | 14 | 18 | — |
| Print Contrast | 9 | 25 | 15 | 23 | 9 | 24 | 23 | 22 |
| Trap | 88 | 92 | 100 | — | 93 | 93 | 100 | — |
| Visual Gray Balance | O.K. | O.K. | O.K. | — | O.K. | O.K. | O.K. | — |
| Slur | Slight | Slight | Slight | — | Slight | Slight | Slight | — |

While this invention is directed towards high quality silver halide printed labels with an expanded color gamut, it is understood that the invention can also be directed toward silver halide output print materials such as silver halide commercial display, consumer photographic print materials and professional photographic print materials. The ability to increase the color gamut has significant commercial value for these products.

Example 2
Synthesis of Polymer P1 (Vinyl-urethane Hybrid Polymer)

Into a dry reactor was charged 96 grams of a diol (Millester® 9-55, MW2000 from Polyurethane Corporation of America), 87 grams of the methylene bis(4-cyclohexyl) isocyanate (Desmodur®W) and 0.02 grams of dibutyltin dilaurate (Aldrich). The mixture was held with stirring for 90 minutes at 94° C. under a blanket of argon after which 14 grams of dimethylol propionic acid was added to the reactor and the mixture stirred for 1.5 hours at 94° C. At this point 24 grams of methyl methacrylate were added and stirred for 1 hour at the same temperature. The resultant prepolymer was cooled to below 40° C., dissolved in a vinyl monomer mixture consisting of 113 grams of n-butyl acrylate, and 188 grams of methyl methacrylate, and then treated with 11 grams of triethylamine and 2.5 grams of initator (AIBN). To this mixture was added 1000 ml deoxygenated water followed by 10 grams of ethylene diamine in 20 grams of water. The dispersion was heated to 65° C., held there with stirring for 2 hours and heated further to 80° C. for 10 hours.

The other polymers used in the environmental protection layers of the Examples described below were obtained commercially. The vinyl-urethane hybrid polymers (similar to P1), SancureAU4010 which is an aliphatic polyurethane-acrylic hybrid polymer was purchased from BF Goodrich, and the Hybridur 570 which is also an acrylic-urethane hybrid polymer was bought from Air Products. Vinyl polymers such as the acrylic copolymers NeoCryl A1110, A6037, A625, A633, A650 and A655 were obtained from NeoResins (a division of Avecia). The polyethylene dispersion, Chem Corr Emulsion 260 obtained from the Chemical Corporation of America. The urethane polymers NeoRez R600, R9679, R960 and R972 all derived from aliphatic polyester diols were obtained from NeoResins (a division of Avecia). The crosslinker CX100 (polyfunctional aziridene), for the environmental protection layer polymers was obtained from NeoResins (a division of Avecia). The lubricant EXP-42-LS, a silicone wax emulsion copolymer was obtained from Genesee Polymers Corporation.

All the environmental protection layers were coated over a silver halide imaged and processed label using the formulation and architecture described below.

A silver halide pressure sensitive packaging label was created by applying a light sensitive silver halide color imaging layers to a pressure sensitive label stock. The label stock consisted of a flexible white biaxially oriented polypropylene face stock coated with a pressure sensitive adhesive that was laminated to a high strength polyester liner. The light sensitive silver halide imaging layers were a yellow, magenta, and cyan coupler system capable of accurate reproduction of flesh tone. This label stock was imaged and processed prior to overcoating with the environmental protection layer.

Biaxially Oriented Polyolefin Face Stock

A composite sheet polyolefin sheet (31 $\mu$m thick) (d=0.68 g/cc) consisting of a microvoided and oriented polypropylene core (approximately 60% of the total sheet thickness), with a homopolymer non-microvoided oriented polypropylene layer on each side of the voided layer, the void initiating material used was poly(butylene terephthalate). The polyolefin sheet had a skin layer consisting of polyethylene and a blue pigment. The polypropylene layer adjacent the voided layer contained 4% rutile $TiO_2$ and optical brightener. The silver halide imaging layers were applied to the blue tinted polyethylene skin layer.

Pressure Sensitive Adhesive

Permanent water based acrylic adhesive 12 $\mu$m thick

Polyester Liner

A polyethylene terephthalate liner 37 $\mu$m thick that was transparent. The polyethylene terephthalate base had a stiffness of 15 millinewtons in the machine direction and 20 millinewtons in the cross direction.

Structure of the photographic packaging label material prior to adding the image layer of the example is as follows:

| |
| --- |
| Voided polypropylene base |
| Acrylic pressure sensitive adhesive |
| Polyester liner |

Silver chloride emulsions were chemically and spectrally sensitized as described below. A biocide comprising a mixture of N-methyl-isothiazolone and N-methyl-5-chloro-isthiazolone was added after sensitization.

Blue Sensitive Emulsion (Blue EM-1). A high chloride silver halide emulsion is precipitated by adding approximately equimolar silver nitrate and sodium chloride solutions into a well-stirred reactor containing glutaryldiaminophenyldisulfide, gelatin peptizer, and thioether ripener. Cesium pentachloronitrosylosmate(II) dopant is added during the silver halide grain formation for most of the precipitation, followed by the addition of potassium hexacyanoruthenate(II), potassium (5-methyl-thiazole)-pentachloroiridate, a small amount of KI solution, and shelling without any dopant. The resultant emulsion contains cubic-shaped grains having edge length of 0.6 $\mu$m. The emulsion is optimally sensitized by the addition of a colloidal suspension of aurous sulfide and heat ramped to 60° C., during which time blue sensitizing dye BSD-4, potassium hexchloroiridate, Lippmann bromide, and 1-(3-acetamidophenyl)-5-mercaptotetrazole were added.

Green Sensitive Emulsion (Green EM-1): A high chloride silver halide emulsion is precipitated by adding approximately equimolar silver nitrate and sodium chloride solutions into a well-stirred reactor containing gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic-shaped grains of 0.3 μm in edge length size. The emulsion is optimally sensitized by the addition of glutaryldiaminophenyldisulfide, a colloidal suspension of aurous sulfide and heat ramped to 55° C., during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1): A high chloride silver halide emulsion is precipitated by adding approximately equimolar silver nitrate and sodium chloride solutions into a well-stirred reactor containing gelatin peptizer and thioether ripener. During the silver halide grain formation, potassium hexacyanoruthenate(II) and potassium (5-methylthiazole)-pentachloroiridate are added. The resultant emulsion contains cubic shaped grains of 0.4 μm in edge length size. The emulsion is optimally sensitized by the addition of glutaryldiaminophenyldisulfide, sodium thiosulfate, tripotassium bis{2-[3-(2-sulfobenzamido)phenyl]-mercaptotetrazole} gold(I) and heat ramped to 64° C., during which time 1-(3-acetamidophenyl)-5-mercaptotetrazole, potassium hexachloroiridate, and potassium bromide are added. The emulsion is then cooled to 40° C., pH adjusted to 6.0, and red sensitizing dye RSD-1 is added.

Coupler dispersions were emulsified by methods well known to the art, and the following layers were coated on the following support: The following flesh tone optimized light sensitive silver halide imaging layers were utilized to prepare photographic label utilizing the invention label base material. The following imaging layers were coated utilizing curtain coating. The gelatin containing layers were hardened with bis(vinylsulfonyl methyl) ether at 1.95% of the total gelatin weight.

TABLE 1

| Layer | Item | Laydown (g/m$^2$) |
|---|---|---|
| Layer 1 | Blue Sensitive Layer | |
| | Gelatin | 1.3127 |
| | Blue sensitive silver (Blue EM-1) | 0.2399 |
| | Y-4 | 0.4143 |
| | ST-23 | 0.4842 |
| | Tributyl Citrate | 0.2179 |
| | ST-24 | 0.1211 |
| | ST-16 | 0.0095 |
| | Sodium Phenylmercaptotetrazole | 0.0001 |
| | Piperidino hexose reductone | 0.0024 |
| | 5-chloro-2-methyl-4-isothiazolin-3-one/2-methyl-4-isothiazolin-3-one(3/1) | 0.0002 |
| | SF-1 | 0.0366 |
| | Potassium chloride | 0.0204 |
| | Dye-1 | 0.0148 |
| Layer 2 | Interlayer | |
| | Gelatin | 0.7532 |
| | ST-4 | 0.1076 |
| | S-3 | 0.1969 |
| | 5-chloro-2-methyl-4-isothiazolin-3-one/2-methyl-4-isothiazolin-3-one(3/1) | 0.0001 |
| | Catechol disulfonate | 0.0323 |
| | SF-1 | 0.0081 |
| Layer 3 | Green Sensitive Layer | |
| | Gelatin | 1.1944 |
| | Green Sensitive Silver (Green EM-1) | 0.1011 |
| | M-4 | 0.2077 |
| | Oleyl Alcohol | 0.2174 |
| | S-3 | 0.1119 |
| | ST-21 | 0.0398 |
| | ST-22 | 0.2841 |
| | Dye-2 | 0.0073 |
| | 5-chloro-2-methyl-4-isothiazolin-3-one/2-methyl-4-isothiazolin-3-one(3/1) | 0.0001 |
| | SF-1 | 0.0236 |
| | Potassium chloride | 0.0204 |
| | Sodium Phenylmercaptotetrazole | 0.0007 |
| Layer 4 | M/C Interlayer | |
| | Gelatin | 0.7532 |
| | ST-4 | 0.1076 |
| | S-3 | 0.1969 |
| | Acrylamide/t-Butylacrylamide sulfonate copolymer | 0.0541 |
| | Bis-vinylsulfonylmethane | 0.1390 |
| | 3,5-Dinitrobenzoic acid | 0.0001 |
| | Citric acid | 0.0007 |
| | Catechol disulfonate | 0.0323 |
| | 5-chloro-2-methyl-4-isothiazolin-3-one/2-methyl-4-isothiazolin-3-one(3/1) | 0.0001 |
| Layer 5 | Red Sensitive Layer | |
| | Gelatin | 1.3558 |
| | Red Sensitive silver (Red EM-1) | 0.1883 |
| | IC-35 | 0.2324 |
| | IC-36 | 0.0258 |
| | UV-2 | 0.3551 |
| | Dibutyl sebacate | 0.4358 |
| | S-6 | 0.1453 |
| | Dye-3 | 0.0229 |
| | Potassium p-toluenethiosulfonate | 0.0026 |
| | 5-chloro-2-methyl-4-isothiazolin-3-one/2-methyl-4-isothiazolin-3-one(3/1) | 0.0001 |
| | Sodium Phenylmercaptotetrazole | 0.0005 |
| | SF-1 | 0.0524 |
| Layer 6 | UV Overcoat | |
| | Gelatin | 0.8231 |
| | UV-1 | 0.0355 |
| | UV-2 | 0.2034 |
| | ST-4 | 0.0655 |
| | SF-1 | 0.0125 |
| | S-6 | 0.0797 |
| | 5-chloro-2-methyl-4-isothiazolin-3-one/2-methyl-4-isothiazolin-3-one(3/1) | 0.0001 |
| Layer 7 | SOC | |
| | Gelatin | 0.6456 |
| | Ludox AM ™ (colloidal silica) | 0.1614 |
| | Polydimethylsiloxane (DC200 ™) | 0.0202 |
| | 5-chloro-2-methyl-4-isothiazolin-3-one/2-methyl-4-isothiazolin-3-one(3/1) | 0.0001 |
| | SF-2 | 0.0032 |
| | Tergitol 15-S-5 ™ (surfactant) | 0.0020 |
| | SF-1 | 0.0081 |
| | Aerosol OT ™ (surfactant) | 0.0029 |

The rolls of light sensitive silver halide emulsion coated on the label support of this example were printed using a digital CRT photographic printer. Several test images that contained graphics, text, and images were printed on the photographic packaging label material. The printed images were then developed using standard reflective photographic RA 4 wet chemistry. At this point, the image was formed on a thin label support. The environmental protection layers of the invention were applied using extrusion hopper coating from a coating solution at 13 weight percent solids over the topmost gelatin layer of the imaging layers.

The structure of the imaged, protected silver halide pressure sensitive packaging label was as follows:

| |
|---|
| Environmental protection layer |
| Developed silver halide imaging layers (yellow, magenta and cyan) |
| Voided polypropylene base |
| Acrylic pressure sensitive adhesive |
| Polyester liner |

Label Test

The above silver halide packing label material was hand applied to several round untreated HDPE bottles to simulate application of the label to a package. The bottles were placed in a controlled humidity oven at 120° F. and 10% RH for 24 hours and the label lift-off from the bottle examined visually and compared to a label with no environmental protection layer.

Indentation Modulus Measurements

The modulus of the urethane polymers of the environmental protection layer in the absence of the vinyl polymer were measured by coating a 5 micrometer thick layer of the urethane polymer in the absence of the vinyl polymer on the processed silver halide label processing material. All samples were conditioned at 73 F./50% RH for at least 18 hours prior to measurement. Following this conditioning period, the load-displacement properties of the materials were determined using a Hysitron nanoindenter equipped with a 2 micron radius spherical diamond indenter. A 1000 uN target load and a 20 uN/second loading rate was used in all cases. The data was then analyzed using a modified Oliver and Pharr relationship to calculate a reduced modulus and modulus for each coating.

Examples 3–6

The vinyl polymer Sancure AU 4010 (acrylic-urethane hybrid polymer) was coated as a mixture with urethane polymers of differing indentation modulus as the environmental protection layer. The Sancure AU 4010 was present at 50 weight percent of the total polymer in the layer. The dry coverage of the polymer mixture was 2.15 g/m$^2$. The polymer layer was crosslinked with 3 weight percent CX100 with respect to the total polymer in the layer. The layer also contained 0.43 g/m$^2$ of EXP-24-LS lubricant. Table 3 shows the effect of the indentation modulus of the urethane polymer on the coating quality. It can be seen that when the indentation modulus of the urethane component is less than 0.6 GPa the coating is free of cracks. It is theorized that the in the absence of a soft urethane polymer (indentation modulus less than 0.6), the vinyl polymer, in this case, Sancure AU4010, at coverages less than 10 micrometers dries rapidly to form a brittle coating that cracks from the pressure generated by the incompletely dried swollen gelatin layer underneath. In the presence of the urethane polymer of this invention, the brittleness of the environmental protection layer is removed by the soft urethane that acts as plasticizer to the vinyl polymer.

TABLE 3

| Example | Description of urethane polymer | Indentation Modulus (GPa) | Coating quality |
|---|---|---|---|
| 3 | NeoRez R600 (Invention) | 0 | Glossy |
| 4 | NeoRez R972 (Invention) | 0.1 | Glossy |
| 5 | NeoRez R9679 | 0.75 | Fine cracks |
| 6 | NeoRez R960 | 0.85 | Cracks |

Examples 7–14

The following examples show the effect of the urethane polymer component of indentation modulus less than 0.6 GPa of the environmental protection layer, in preventing cracks in the overcoat comprising various vinyl polymers. An olefinic, acrylic and acrylic-urethane hybrid polymer were coated by themselves and as a mixture with a urethane polymer of indentation modulus less than 0.6 GPa, NeoRez R600. The dry coverage of the polymers were held constant at 2.15 g/m$^2$ in the layer. The polymer layer was crosslinked with 3 weight percent CX100 with respect to the total polymer in the layer. The layer also contained 0.43 g/m$^2$ of EXP-24-LS lubricant. As Table 4 shows all the vinyl polymers by themselves were cracked while they produced glossy crack-free coatings in the presence of the urethane polymer. The theory behind this is explained in the previous example 3–6.

TABLE 4

| Example | Description of polymer (weight ratio) | Coating quality |
|---|---|---|
| 7 | ChemCorr 260 | Cracks |
| 8 | NeoCryl A6037 | Cracks |
| 9 | Sancure AU4010 | Cracks |
| 10 | Hybridur 570 | Cracks |
| 11 | ChemCorr 260/NeoRez R600 60/40 (Invention) | Glossy |
| 12 | NeoCryl A6037/NeoRez R600 50/50 (Invention) | Glossy |
| 13 | Sancure AU 4010/NeoRez R600 60/40 (Invention) | Glossy |
| 14 | Hybridur 570/NeoRez R600 60/40 (Invention) | Glossy |

Example 15–21

Several environmental protection layers were coated on the silver halide label and hand applied to untreated IIDPE bottles as mentioned earlier. The dry coverage of the polymer mixtures was 2.15 g/m$^2$. The polymer layer was crosslinked with 3 weight percent CX100 with respect to the total polymer in the layer. The layer also contained 0.43 g/m$^2$ of EXP-24-LS lubricant. The effect of these layers in reducing label-curl at 120° F. 10% RH was evaluated by measuring the curl induced lift-off of the label from the bottle after incubating the labeled bottles in the aforementioned conditions for 24 hours. The extent of lift-off was determined by measuring the height of the highest point of the label from the surface of the bottle. Table 5 shows, the environmental protection layers that were coated on the label. In all cases the curl was minimized compared to the check. This is because the check has exposed unprotected gelatin on the surface of the label that makes it very sensitive to relative humidity. As the humidity is reduced and the temperature raised, the difference in behavior between gelatin and the label face stock in response to the environment causes the label to curl towards the gelatin and lift-off from the HDPE bottle. Further, the lack of surface treatment of the bottle-surface prior to application of the label exacerbates the problem. The environmental protection layer over the gelatin layer creates a barrier to moisture and relative humidity, thereby reducing the sensitivity of gelatin to RH and minimizing the problem of label lift-off.

TABLE 5

| Example | Description of polymer (weight ratio) |
|---|---|
| 15 | Check No polymer |
| 16 | P1/NeoRez R600 60/40 |
| 17 | NeoCryl A1110/NeoRez R600 50/50 |

TABLE 5-continued

| Example | Description of polymer (weight ratio) |
|---------|---------------------------------------|
| 18 | NeoCryl A625/NeoRez R600 50/50 |
| 19 | NeoCryl A633/NeoRez R600 50/50 |
| 20 | NeoCryl A650/NeoRez R600 50/50 |
| 21 | NeoCryl A655/NeoRez R600 50/50 |

The invention has been described in detail with particular reference to certain preferred embodiments thereof, but it will be understood that variations and modifications can be effected within the spirit and scope of the invention.

Appendix—Compounds Used in Examples

BSD-4
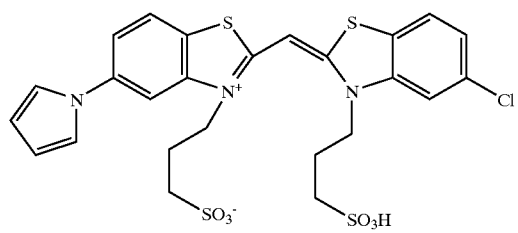

GSD-1
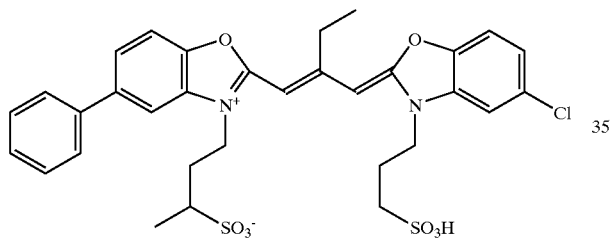

RSD-1
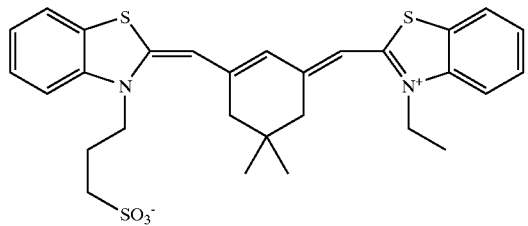

Y-4
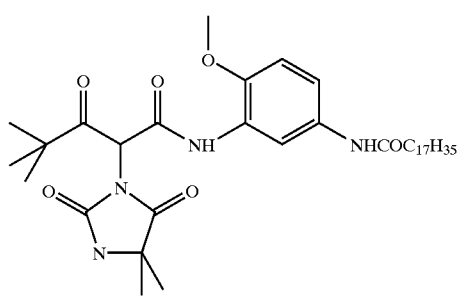

ST-23
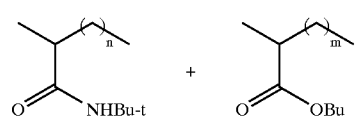

ST-24
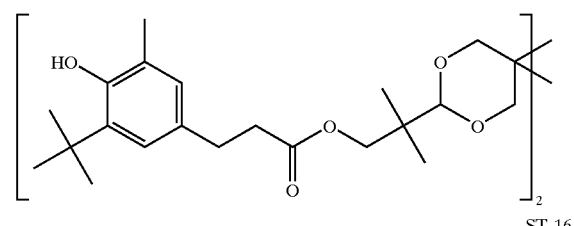

ST-16
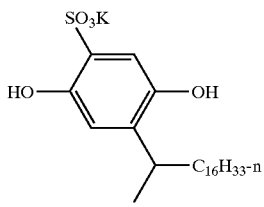

SF-1
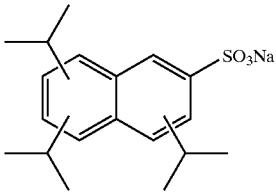

Dye-1
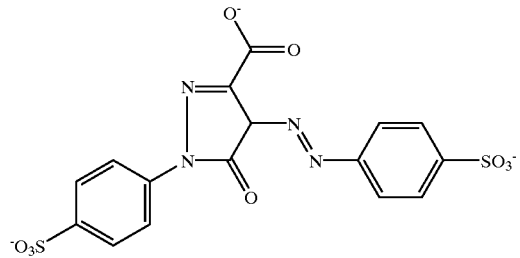

ST-4
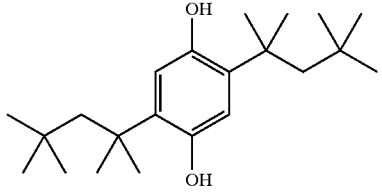

S-3
Diundecyl phthalate

M-4
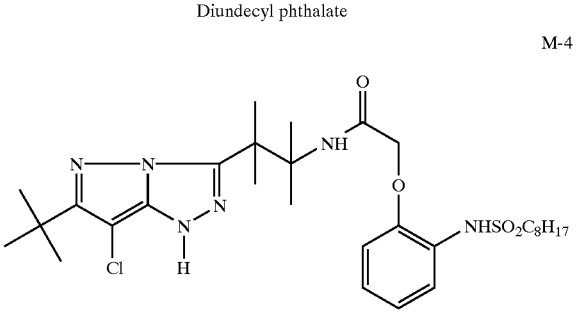

ST-21
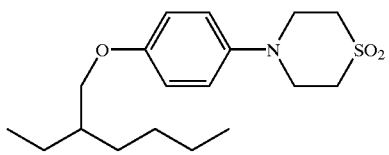

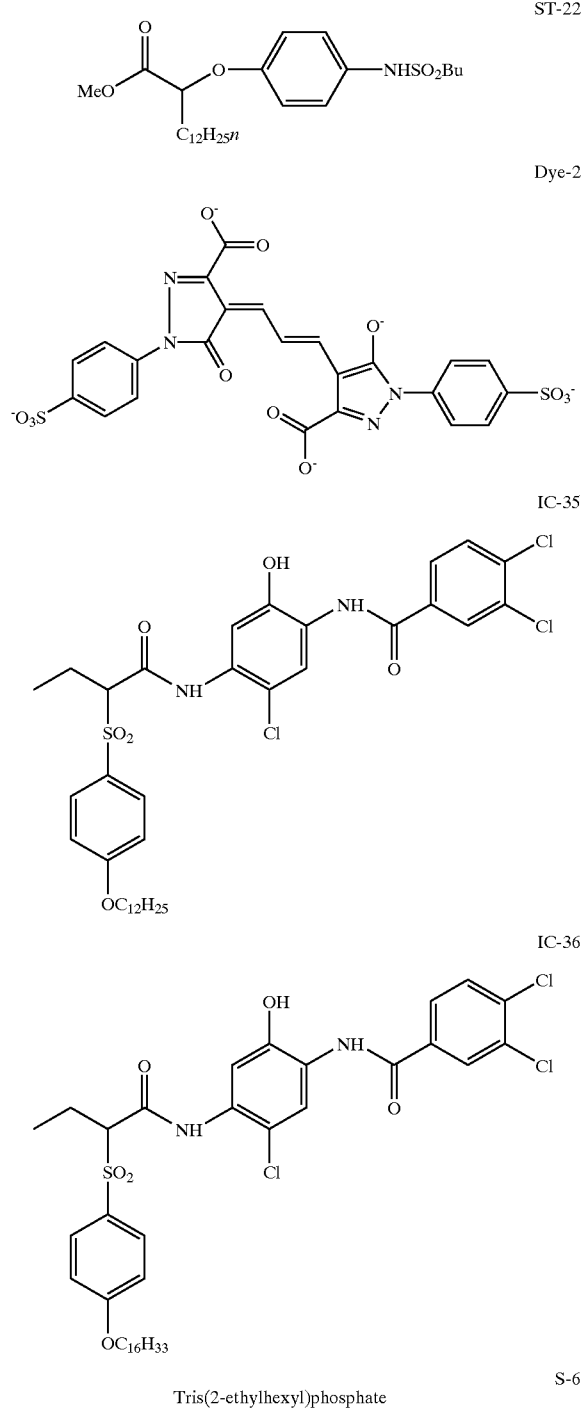

What is claimed is:

1. A photographic label comprising a pragmatic polymer sheet, at least one layer comprising an image comprising dyes formed from couplers above said pragmatic polymer sheet, and a lower strippable paper carrier, a pressure sensitive adhesive layer between said lower strippable carrier and said pragmatic polymer sheet, and an environmental protection layer overlaying at least one photosensitive layer wherein said carrier has exposed edges where it has a greater surface area than the pragmatic sheet and said image further comprises fiducial marks.

2. The photographic label of claim 1 wherein said pragmatic polymer sheet comprises a voided polymeric sheet.

3. The photographic label of claim 1 wherein said environmental protection layer comprises a mixture of a vinyl polymer and urethane polymer wherein said urethane polymer has an indentation modulus less than 0.6 GPa and wherein said environmental protection layer is less than 10 micrometers in thickness.

4. The photographic label of claim 1 wherein said fiducial marks comprise coupler formed marks with a density of greater than 0.5.

5. The photographic label of claim 1 wherein said exposed edges have a width of less than 20 mm.

6. The photographic label of claim 1 wherein said exposed edges have a width of between 4 and 16 mm.

7. The photographic label of claim 2 wherein said voided polymeric sheet further comprises a integral polymer layer containing between 8 and 24% by weight of white pigment.

8. The photographic label of claim 1 wherein said lower strippable carrier has a stiffness of between 15 and 60 millinewtons and an L* is greater than 92.0, and wherein said carrier has a stiffness of between 40 and 120 millinewtons.

9. The photographic label of claim 1 wherein said base lower strippable base comprises cellulose paper has an edge penetration of less than 8 mm and contains salt between 0.1 and 0.5% by weight of cellulose fibers.

10. A photographic element for forming a label comprising a pragmatic polymer sheet, at least one layer comprising at least one image forming layer comprising photosensitive silver halide grains and dye forming coupler above said pragmatic polymer sheet, and a lower strippable paper carrier, a pressure sensitive adhesive layer between said lower strippable carrier and said pragmatic polymer sheet, wherein said carrier has exposed edges where it has a greater surface area than the pragmatic sheet and said image forming layer comprises at least one layer comprising said photosensitive silver halide grains has an exposure time to obtain a usable Dmax of 1.5 of less than 0.01 seconds.

11. The photographic element of claim 10 wherein said image forming layer is free of image dye stabilizers.

12. The photographic element of claim 10 wherein said photographic label is substantially free of uv inhibitors.

13. The photographic label of claim 1 wherein said photographic label comprises an image having at least one overcoat layer over said image comprising at least one tactile or olfactory feature.

14. The photographic label of claim 1 wherein said image has at least one partial layer overlaying said image that comprises an olfactory feature.

15. The photographic label of claim 13 wherein said tactile or olfactory feature location corresponds to a complimentary area of said image.

16. The photographic element of claim 10 wherein said element when exposed with an exposure time of less than 0.01 seconds results in a pixel resolution of greater than 250 pixels per inch.

17. The photographic label of claim 10 wherein said at least one image forming layer comprising photosensitive silver halide grains and dye forming coupler further comprises between 2 and 12% 1,2 hexanediol.

18. A method of forming a label comprising providing a pragmatic polymer sheet, at least one layer comprising at least one image forming layer comprising photosensitive silver halide grains and dye forming coupler above said pragmatic polymer sheet, and a lower strippable paper carrier, a pressure sensitive adhesive layer between said lower strippable carrier and said pragmatic polymer sheet, wherein said carrier has exposed edges where it has a greater surface area than the pragmatic sheet and said image further comprises fiducial marks and said at least one layer comprising said photosensitive silver halide grains has an exposure time to obtain a usable Dmax of 1.5 of less than 0.01 seconds, imaging an image and fiducial marks onto said imaged layer at an exposure time of less than 0.01 seconds, developing the image and fiducial marks in less than 50 seconds, drying said image at less than 70° C., applying an environmental protection layer over said image, dye cutting said imaged material to form labels on said carrier, removing the non-label pragmatic sheet from around said label.

19. The method of claim 18 further comprising removing said carrier and applying said label to a package.

20. The method of claim 18 wherein developed silver halide image is further provided with ink jet printed area.

21. The method of claim 18 wherein said polymer pragmatic sheet carrying at least one layer comprising a photographic image formed by combination of dyes formed from couplers wherein areas of said photo image are colored without dyes formed by couplers.

22. The method of claim 18 where in the environmental protection layer further comprises a lubricant on the side of said environment protection layer opposite said primer layer.

23. The method of claim 18 comprising in order a ultraviolet radiation cured environmental protection layer, a primer layer, a hydrophilic image layer, a base and an adhesive layer.

24. The method of claim 23 wherein said primer layer comprises an acrylic latex copolymer containing acid functionalities.

25. The method of claim 23 comprising in order an environmental protection layer, an image formed in a gelatin media, a base, an adhesive, and a peelable back wherein said environmental protection layer comprises a mixture of vinyl polymer and urethane polymer wherein said urethane polymer has an indentation modulus less than 0.6 GPa and wherein said environmental protection layer is less than 10 micrometers in thickness.

26. The method of claim 24 wherein said vinyl polymer comprises at least one acrylic polymer or a vinyl-urethane hybrid polymer or a polyolefin.

27. The method of claim 24 wherein the said mixture of vinyl polymer and urethane polymer comprises an amount in the environmental protective layer of from 15 to 65 weight percent of the vinyl polymer.

28. A method of label distribution comprising forming a label file, managing said label file to calibrate said label file with at least one silver halide output device, distributing said label file to at least two devices in separate geographic locations, printing labels, wherein said labels comprise a pragmatic polymer sheet, at least one layer comprising an image comprising dyes formed from couplers above said pragmatic polymer sheet, and a lower strippable paper carrier, a pressure sensitive adhesive layer between said lower strippable carrier and said pragmatic polymer sheet, and an environmental protection layer overlaying at least one photosensitive layer wherein said carrier has exposed edges where it has a greater surface area than the pragmatic sheet and said image further comprises fiducial marks.

29. The distribution method of claim 28 wherein output to at least one of said devices is different than to the other devices.

30. The distribution method of claim 28 wherein language is added to said image prior to label printing.

31. The distribution method of claim 28 wherein consumption of labeled goods is utilized to control output to said devices.

32. The distribution method of claim 28 wherein output to said devices is interactive with market response to said labels.

33. The distribution method of claim 28 wherein said output to said devices is adapted to select different images from a directory of images.

* * * * *